(12) United States Patent
Xu

(10) Patent No.: US 11,983,334 B2
(45) Date of Patent: May 14, 2024

(54) DISPLAY METHOD AND RELATED APPARATUS

(71) Applicant: Huawei Technologies Co., Ltd., Shenzhen (CN)

(72) Inventor: Jie Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 344 days.

(21) Appl. No.: 17/417,545

(22) PCT Filed: Dec. 17, 2019

(86) PCT No.: PCT/CN2019/125800
§ 371 (c)(1),
(2) Date: Jun. 23, 2021

(87) PCT Pub. No.: WO2020/143408
PCT Pub. Date: Jul. 16, 2020

(65) Prior Publication Data
US 2022/0057866 A1     Feb. 24, 2022

(30) Foreign Application Priority Data

Jan. 11, 2019   (CN) .......................... 201910026700.0

(51) Int. Cl.
*G06F 3/0346*  (2013.01)
*G06F 1/16*    (2006.01)
(Continued)

(52) U.S. Cl.
CPC .......... *G06F 3/0346* (2013.01); *G06F 1/1641* (2013.01); *G06F 1/1649* (2013.01);
(Continued)

(58) Field of Classification Search
CPC .... G06F 3/0346; G06F 1/1641; G06F 1/1649; G04N 23/57; G04N 23/90; G04N 23/632; G04N 7/142; G04B 1/3827
(Continued)

(56) References Cited

U.S. PATENT DOCUMENTS 7,280,857 B2 * 10/2007 Geernaert ........... H04M 1/0233
455/566
9,152,176 B2 * 10/2015 Gimpl ................... G06F 1/1677
(Continued)

FOREIGN PATENT DOCUMENTS

CN    103780747 A    5/2014
CN    106155476 A    11/2016
(Continued)

*Primary Examiner* — Binh Kien Tieu
(74) *Attorney, Agent, or Firm* — Slater Matsil, LLP

(57) ABSTRACT

An electronic device displays, on a first display of a foldable display, a user interface provided by a reading application, a user may flip over the electronic device, to trigger the electronic device to display, on a second display of the foldable display, a user interface provided by the reading application. In addition, the second display may display the user interface in a form suitable for reading by the user. The user can trigger, in an interaction manner of flipping over the electronic device, the electronic device to display, on the second display with reference to a currently running application or a current location, content that the user expects to view.

15 Claims, 25 Drawing Sheets

(51) Int. Cl.
  *H04B 1/3827* (2015.01)
  *H04N 7/14* (2006.01)
  *H04N 23/57* (2023.01)
  *H04N 23/63* (2023.01)
  *H04N 23/90* (2023.01)

(52) U.S. Cl.
  CPC ........... *H04B 1/3827* (2013.01); *H04N 7/142* (2013.01); *H04N 23/57* (2023.01); *H04N 23/632* (2023.01); *H04N 23/90* (2023.01)

(58) Field of Classification Search
  USPC ...................................................... 348/14.03
  See application file for complete search history.

(56) References Cited

U.S. PATENT DOCUMENTS

| | | |
|---|---|---|
| 9,727,134 B2 | 8/2017 | Aurongzeb et al. |
| 10,078,348 B1 | 9/2018 | Xu et al. |
| 10,839,773 B2 | 11/2020 | Nemoto et al. |
| 10,866,694 B2 | 12/2020 | Kim et al. |
| 2006/0264243 A1* | 11/2006 | Aarras .................. G06F 3/0483 455/566 |
| 2009/0015703 A1 | 1/2009 | Kim et al. |
| 2009/0295943 A1* | 12/2009 | Kim ....................... H04N 23/81 348/222.1 |
| 2011/0117971 A1 | 5/2011 | Kim et al. |
| 2011/0159928 A1 | 6/2011 | Nii |
| 2011/0216064 A1* | 9/2011 | Dahl ................... H04M 1/0247 345/428 |
| 2012/0032979 A1 | 2/2012 | Blow et al. |
| 2012/0162115 A1* | 6/2012 | Lim ..................... G06F 3/1446 345/173 |
| 2014/0285476 A1* | 9/2014 | Cho .................... H04M 1/0268 345/204 |
| 2015/0220299 A1* | 8/2015 | Kim ..................... G06F 3/1446 345/1.3 |
| 2015/0309704 A1* | 10/2015 | Bae .................... G06F 3/04883 715/765 |
| 2015/0338888 A1* | 11/2015 | Kim ..................... G06F 1/1643 345/156 |
| 2016/0147263 A1* | 5/2016 | Choi ..................... G06F 1/1652 361/679.3 |
| 2016/0162112 A1* | 6/2016 | Lee ...................... G06F 1/1694 345/173 |
| 2016/0180801 A1 | 6/2016 | Lee et al. |
| 2016/0357489 A1* | 12/2016 | Dong .................... H04N 7/142 |
| 2017/0064388 A1 | 3/2017 | Yu |
| 2017/0083148 A1* | 3/2017 | Ahn ..................... G06F 3/1446 |
| 2017/0208249 A1 | 7/2017 | Choi et al. |
| 2017/0255442 A1* | 9/2017 | Kim ..................... G06F 3/1454 |
| 2017/0356749 A1 | 12/2017 | Shelby et al. |
| 2018/0039408 A1* | 2/2018 | Cheong ................. G06F 3/0481 |
| 2018/0255219 A1* | 9/2018 | Ramaprakash ........ H04N 23/90 |
| 2018/0307270 A1* | 10/2018 | Pantel ................... G06F 1/1637 |
| 2018/0321892 A1 | 11/2018 | Kim et al. |
| 2018/0324964 A1* | 11/2018 | Yoo ...................... H01Q 1/2266 |
| 2019/0130795 A1 | 5/2019 | Yang et al. |
| 2019/0140342 A1* | 5/2019 | Lim ...................... H01Q 13/10 |
| 2019/0187758 A1* | 6/2019 | Lee ...................... G06F 1/1677 |
| 2019/0205930 A1* | 7/2019 | Kim-Whitty ........ G06V 40/161 |
| 2020/0082599 A1* | 3/2020 | Manzari .............. G06F 3/04847 |
| 2020/0212338 A1* | 7/2020 | Ha ......................... H10K 50/86 |
| 2020/0267839 A1* | 8/2020 | Woo .................... H05K 5/0226 |
| 2020/0301641 A1* | 9/2020 | Park ..................... G06F 3/1423 |
| 2020/0310492 A1* | 10/2020 | Kim ..................... G06F 1/1641 |

FOREIGN PATENT DOCUMENTS

| | | |
|---|---|---|
| CN | 106600259 A | 4/2017 |
| CN | 107122979 A | 9/2017 |
| CN | 107656653 A | 2/2018 |
| CN | 107809504 A | 3/2018 |
| CN | 108089794 A | 5/2018 |
| CN | 108196749 A | 6/2018 |
| CN | 108255368 A | 7/2018 |
| CN | 108415677 A | 8/2018 |
| CN | 109889630 A | 6/2019 |
| EP | 3413547 A1 | 12/2018 |
| EP | 3413547 B1 | 12/2021 |
| JP | 2004213558 A | 7/2004 |
| JP | 2013538397 A | 10/2013 |
| JP | 2018084908 A | 5/2018 |
| KR | 101373333 B1 | 3/2014 |
| KR | 20170093658 A | 8/2017 |

\* cited by examiner

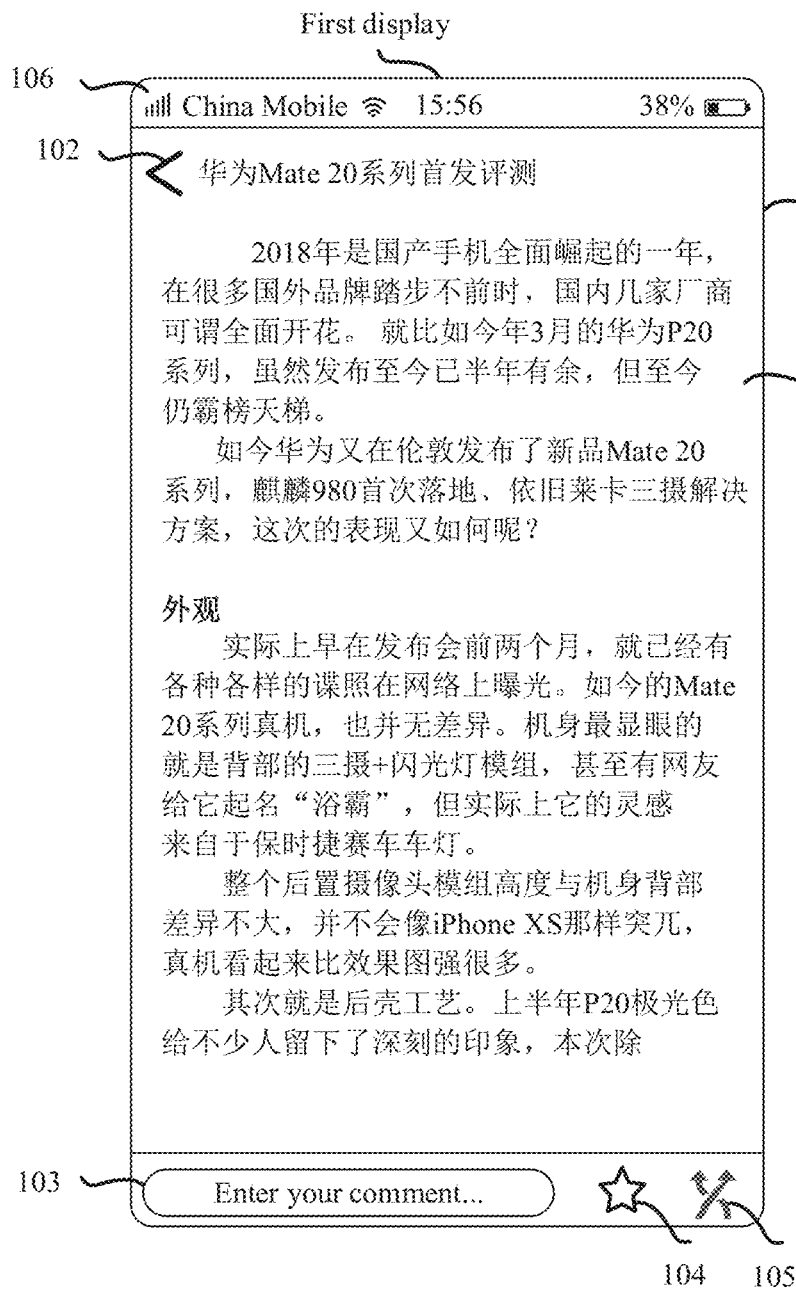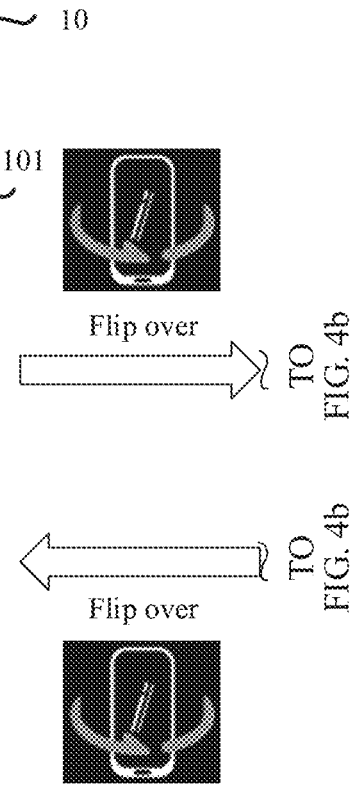
FIG. 4a

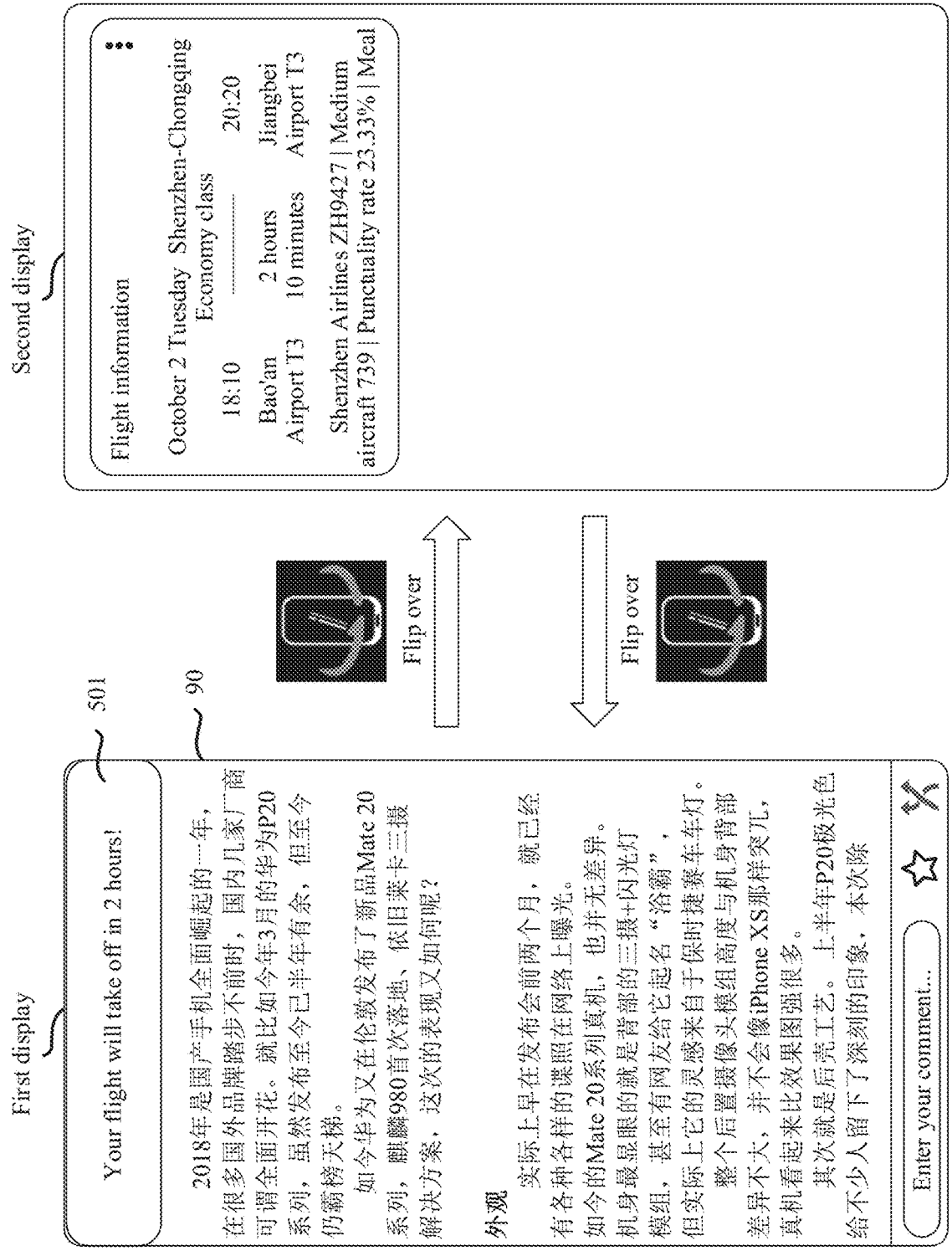

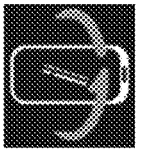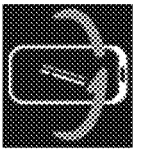
FIG. 11a
FIG. 11b

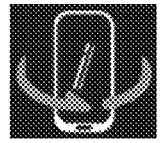
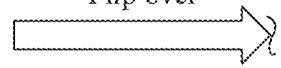
FIG. 12a

DISPLAY METHOD AND RELATED APPARATUS

CROSS-REFERENCE TO RELATED APPLICATIONS

This application is a national stage application of International Application No. PCT/CN2019/125800 filed on Dec. 17, 2019, which claims priority to Chinese Patent Application No. 201910026700.0, filed with the China National Intellectual Property Administration on Jan. 11, 2019 and entitled "DISPLAY METHOD AND RELATED APPARATUS", which is incorporated herein by reference in its entirety.

TECHNICAL FIELD

This application relates to the field of terminal technologies, and in particular, to a display method and a related apparatus.

BACKGROUND

With development of electronic information technologies, electronic devices are becoming increasingly diverse. As a user has an increasingly high requirement for an amount of information provided by an electronic device, many electronic devices are provided with a plurality of displays. For example, the electronic device may be provided with a front display and a rear display, or the electronic device may be provided with a foldable display. When the foldable display is in a folded state, it may be considered that two displays are provided for the user.

The plurality of displays can improve utilization of the electronic device to meet an information browsing requirement of the user. However, in the conventional technology, different content is displayed on each display, and content displayed on a plurality of displays is not associated with each other. As a result, there is a lack of content interworking and interaction, and product values of the plurality of displays are not fully utilized.

Therefore, how to take full advantage of the plurality of displays to provide a more convenient interaction manner for the user and improve user experience is a problem that needs to be urgently resolved currently.

SUMMARY

This application provides a display method and a related apparatus, so that a user can trigger, in an interaction manner of flipping over an electronic device, a second display to display content that the user expects to view, to take full advantage of a plurality of displays to provide a convenient interaction manner for the user. This is easy to operate and can improve user experience.

According to a first aspect, this application provides a display method, applied to an electronic device provided with a foldable display. The method includes: detecting that the foldable display is in a folded state, where the foldable display includes a first display and a second display; displaying a first user interface of a first application on the first display, where the first application is a reading application; and detecting that the electronic device is flipped over, and displaying a second user interface of the first application on the second display, where the second user interface and the first user interface include same interface elements, and the second user interface and the first user interface are different in at least one of the following: a background color, a color of the displayed interface elements, or an arrangement manner of the interface elements.

Specifically, the reading application is an application that provides information such as text or pictures for a user to read. The reading application may include Kindle, WeChat Reading, Douban Reading, Weibo, Zhihu, Jianshu, Toutiao, or the like.

Specifically, adjusting the arrangement manner of the interface elements may include but is not limited to at least one of the following: adjusting a spacing between the interface elements, adjusting a display position of an interface element, adjusting a size of an interface element, or the like.

With reference to the first aspect, in a specific embodiment, the electronic device may adjust a background color of the second user interface to a dark color (for example, black), and adjust the interface elements in the second user interface to an appropriate color (for example, white). Such a display mode can save power and avoid dazzle during reading.

According to the display method in the first aspect, when the electronic device displays, on the first display, a user interface provided by the reading application, the user may flip over the electronic device, to trigger the electronic device to display, on the second display, a user interface provided by the reading application. In addition, the second display may display the user interface in a form suitable for reading by the user, to improve user experience.

According to a second aspect, this application provides a display method, applied to an electronic device provided with a foldable display. The method includes: detecting that the foldable display is in a folded state, where the foldable display includes a first display and a second display, and a camera is disposed at the top of the second display; displaying a first preview screen of a camera application on the first display, where the first preview screen includes an image that the camera captures in a direction of the second display; and detecting that the electronic device is flipped over, and displaying a second preview screen of the camera application on the second display, where the second preview screen includes a face image captured by the camera.

With reference to the second aspect, in some embodiments, the face image included in the second user interface has at least one of the following effects: a depth of field effect, a background blur effect, or a beauty effect. That is, when displaying the second user interface on the second display, the electronic device may switch a current shooting mode to a portrait mode.

With reference to the second aspect or any embodiment of the second aspect, in some embodiments, before the detecting that the foldable display is in a folded state, the method may further include: detecting that the foldable display is in an unfolded state, and displaying a third preview screen of the camera application, where the third preview screen is displayed on both the first display and the second display, and the third preview screen includes the image that the camera captures in the direction of the second display. In some embodiments, the electronic device displays the third preview screen of the camera application on the foldable display in full screen when detecting that the foldable display is in the unfolded state.

With reference to the second aspect or any embodiment of the second aspect, in some embodiments, the electronic device stops power supply to the second display or still displays an original user interface on the second display when displaying the first preview screen of the camera application on the first display.

With reference to the second aspect or any embodiment of the second aspect, in some embodiments, the electronic device stops power supply to the first display or still displays the first preview screen on the first display when displaying the second preview screen of the camera application on the second display.

With reference to the second aspect or any embodiment of the second aspect, in some embodiments, the method further includes: determining, by the electronic device, an area that is on the second display and that is not blocked by a hand of the user; and when the electronic device is flipped over, displaying the second preview screen in the area that is on the second display and that is not blocked by the hand of the user.

According to the method in the second aspect, when the electronic device displays a shooting interface on the first display, the user may flip over the electronic device, to trigger the electronic device to display a selfie interface on the second display. In addition, the electronic device may further switch the shooting mode of the camera application to the portrait mode. This is easy to operate, and can meet a selfie requirement of the user, to improve user experience.

According to a third aspect, this application provides a display method, applied to an electronic device provided with a foldable display. The method includes: detecting that the foldable display is in a folded state, where the foldable display includes a first display and a second display, an aspect ratio of the second display is less than an aspect ratio of the first display, a first camera is disposed at the top of the first display, and a second camera is disposed at the top of the second display; displaying a first user interface of a first application on the first display, where the first application is a video call application, the first user interface includes an image captured by the first camera and an image of the other party in a video call, and the image captured by the first camera overlaps the image of the other party in the video call; and detecting that the electronic device is flipped over, and displaying a second user interface of the first application on the second display, where the second user interface includes an image captured by the second camera and an image of the other party in the video call, and the image captured by the second camera does not overlap the image of the other party in the video call.

Specifically, the video call application is an application that can provide a two-party or multi-party video call. The video call application may include but is not limited to WeChat (WeChat), FaceTime, Skype, or the like.

Specifically, an area of the display occupied by a display area of a shot image and a display area of an image of the other party displayed in the second user interface may be less than an area of the display occupied by a display area of a shot image and a display area of an image of the other party displayed in the first user interface.

With reference to the third aspect or any embodiment of the third aspect, in some embodiments, before the detecting that the foldable display is in a folded state, the method may further include: detecting that the foldable display is in an unfolded state, and displaying a third user interface of the first application, where the third user interface is displayed on both the first display and the second display, and the third user interface is the enlarged first user interface. In some embodiments, the electronic device displays the third user interface of the first application on the foldable display in full screen when detecting that the foldable display is in the unfolded state.

According to the display method in the third aspect, when the electronic device displays a video call interface on the first display, a user may flip over the electronic device, to trigger the electronic device to display a video call interface on the second display. When the video call interface is displayed on the second display, the video call interface is adapted to a size of the second display for display. This is easy to operate and can improve user experience.

According to a fourth aspect, this application provides a display method, applied to an electronic device provided with a foldable display. The method includes: detecting that the foldable display is in a folded state, where the foldable display includes a first display and a second display; displaying a first user interface on the first display; and detecting that the electronic device is flipped over, and displaying a second user interface of a first application on the second display, where the first application is a ride-hailing application, and the second user interface includes trip order information provided by the ride-hailing application; or the first application is a navigation application, and the second user interface is a navigation interface provided by the navigation application.

Specifically, a user may release ride-hailing information by using the ride-hailing application, that is, place an order. A driver matching the ride-hailing information may receive the order and drive the user to a destination. The ride-hailing application may include but is not limited to DiDi, Uber (Uber), Lyft, or the like.

Specifically, the navigation application may include but is not limited to AutoNavi, Google Maps, Baidu Map, or the like.

According to the display method in the fourth aspect, after the user places an order on the first display by using the ride-hailing application, the user may flip over the electronic device, to trigger the electronic device to display the order information on the second display, so that the user can conveniently view an order progress. This improves user experience. Alternatively, after the user performs navigation on the first display by using the navigation application, the user may flip over the electronic device, to trigger the electronic device to display the navigation interface on the second display. This improves user experience.

According to a fifth aspect, this application provides a display method, applied to an electronic device provided with a foldable display. The method includes: detecting that the foldable display is in a folded state, where the foldable display includes a first display and a second display; displaying a first user interface on the first display; and detecting that the electronic device is flipped over, and displaying a second user interface of the first application on the second display, where the first user interface includes notification information of a new message received by the first application, the second user interface includes specific content of the new message, and an amount of information included in the specific content of the new message is greater than an amount of information included in the notification information of the new message.

Specifically, the first application may be an application that is run on the electronic device and that can receive a new message. The first application may include but is not limited to a Messages application, an instant messaging application, a ticket booking application (for example, Booking, Qunar, or Ctrip), or the like. The electronic device may receive a new message by using the first application. The new message may include but is not limited to an SMS message, an instant chat message (for example, a WeChat message or a Skype message), an application notification message (for example, a push message of an application), or the like.

With reference to the fifth aspect, in some embodiments, the electronic device stops displaying the notification information of the new message on the first display when displaying the second user interface of the first application on the second display.

According to the display method in the fifth aspect, when the electronic device displays the notification information of the new message on the first display, a user may flip over the electronic device, to trigger the electronic device to display the specific content of the new message on the second display. The user can view the specific content of the new message through a simple user operation, and get good user experience.

According to a sixth aspect, this application provides a display method, applied to an electronic device provided with a foldable display. The method includes: detecting that the foldable display is in a folded state, where the foldable display includes a first display and a second display; displaying a first user interface on the first display; obtaining, by the electronic device, a current location; and detecting that the electronic device is flipped over, and displaying a second user interface on the second display, where the second user interface is associated with the current location of the electronic device.

With reference to the sixth aspect, in some embodiments, when the electronic device is located in a subway station, the second user interface includes a subway ride code, or the second user interface is an NFC bus card swiping interface. The subway ride code displayed on the second display may be obtained in the following manner: The electronic device invokes a ride function provided by some applications, for example, a WeChat mini program, to obtain the subway ride code. The NFC bus card swiping interface displayed on the second display may be obtained in the following manner: The electronic device starts a wallet application, invokes an NFC bus card, and displays the NFC bus card swiping interface on the second display, where the NFC bus card is added by a user to the wallet application in advance.

In some embodiments, to prevent a misoperation, the electronic device may further display the subway ride code on the second display with reference to a time in which the user is in a subway station. For example, if the time in which the user is in a subway station is a predetermined time period (for example, 7:00 to 9:00 and 17:00 to 22:00 on a working day that correspond to a time period spent traveling to work and a time period spent traveling from work respectively), when the user flips over the electronic device, the electronic device displays the subway ride code on the second display. Displaying the subway ride code on the second display with reference to the time in which the user is in a subway station can avoid that the user mistakenly triggers the second display to display the subway ride code when the user is in a subway station but does not want to take subway, for example, when the user passes a subway station at 12:00 noon but does not want to take subway.

According to this embodiment of the sixth aspect, when the user is in a subway station, the user may flip over the electronic device, to trigger the electronic device to display the subway ride code or the NFC bus card swiping interface on the second display. The user may complete payment by using the subway ride code or the NFC bus card swiping interface, and the user can take subway successively. In other words, the user may trigger, through a simple user operation, the electronic device to display the subway ride code or the NFC bus card swiping interface, so that the user takes subway conveniently, and gets good user experience.

With reference to the sixth aspect, in some embodiments, when the electronic device is located in a shopping mall, the second user interface includes a payment code, or the second user interface is an NFC bank card payment interface. The payment code may be a bar code and a two-dimensional code, and the payment code may be provided by a payment application (for example, WeChat or Alipay) installed on the electronic device. The NFC bank card payment interface may be obtained in the following manner: The electronic device starts a wallet application, invokes an NFC bank card, and displays the NFC bank card swiping interface on the second display, where the NFC bank card is added by the user to the wallet application of the electronic device in advance.

According to this embodiment of the sixth aspect, when the user is in a shopping mall, the user may flip over the electronic device, to trigger the electronic device to display the payment code or the NFC bank card swiping interface on the second display. In some other embodiments, when the user is in a shopping mall, the user may further flip over the electronic device, to trigger the electronic device to display a promo code/coupon, an electronic movie ticket, a movie ticket pickup code, and the like on the second display. This facilitates consumption of the user in a shopping mall. The electronic movie ticket and the movie ticket pickup code may be provided by a ticketing application (for example, Maoyan, Taopiaopiao, or Meituan).

With reference to the sixth aspect, in some embodiments, when a distance between the location of the electronic device and a parcel locker is less than a preset value, the second user interface includes a parcel pickup code. Herein, the pickup code may be a numeric password. In some embodiments, the second user interface may further include one or more of the following: an express company, an express order number, an image of an article, a name of the article, an address of a parcel locker to which the article is delivered, a company to which the parcel locker belongs, and the like. The pickup code and other information displayed on the second display may be obtained in the following several manners: 1. The electronic device obtains the pickup code and the other information from a database of an express company. 2. The electronic device reads an SMS message of the user, and obtains the pickup code and the other information from the SMS message of the user. 3. The electronic device obtains the pickup code and the other information from a third-party application (for example, Taobao or Jingdong).

In some embodiments, to prevent the second display from being mistakenly triggered to display the pickup code, the electronic device may further display the pickup code on the second display with reference to an address of a parcel locker to which a commodity is delivered. Specifically, when the electronic device is located near a parcel locker, the electronic device may compare a location of the parcel locker with an address of a parcel locker to which the user's article is delivered, to determine whether the parcel locker is the parcel locker to which the article is delivered. If the parcel locker is the parcel locker to which the article is delivered, the pickup code is displayed on the second display.

According to this embodiment of the sixth aspect, when the user is near a parcel locker, the user may flip over the electronic device, to trigger the electronic device to display the pickup code on the second display. The user may pick up a parcel by using the pickup code. In other words, the user may trigger, through a simple user operation, the electronic device to display the pickup code, to successfully pick up a parcel, and get good user experience.

With reference to the sixth aspect or any embodiment of the sixth aspect, the method may further include: The electronic device receives verification information entered by the user, and the electronic device displays the second user interface on the second display when the received verification information entered by the user is consistent with verification information prestored in the electronic device. This manner can ensure data security of the electronic device.

With reference to the sixth aspect or any embodiment of the sixth aspect, the electronic device may obtain current location information in the following several manners: 1. The current location information is obtained by using a navigation system such as the GPS, the GLONASS, or the BDS. 2. The current location information is obtained through a network. For example, the current location information is obtained through base station positioning, Wi-Fi positioning, a location based service (location based service, LBS), or a geo-fence technology.

With reference to the first aspect, any embodiment of the first aspect, the fourth aspect, any embodiment of the fourth aspect, the fifth aspect, any embodiment of the fifth aspect, the sixth aspect, or any embodiment of the sixth aspect, in some embodiments, before the detecting that the foldable display is in a folded state, the method may further include: detecting that the foldable display is in an unfolded state, and displaying a third user interface, where the third user interface is displayed on both the first display and the second display, and content displayed in the third user interface includes content displayed in the first user interface. In other words, the folded state of the foldable display may change from the unfolded state. That the content displayed when the foldable display is in the unfolded state includes the content displayed in the first user interface may mean that a user interface that is displayed when the foldable display is in the unfolded state is the enlarged user interface that is displayed on the first display when the foldable display is in the folded state, or may mean that a user interface that is displayed when the foldable display is in the unfolded state not only includes content displayed on the first display when the foldable display is in the folded state, but also includes other content, for example, more text and controls.

In some embodiments, the electronic device displays the third user interface on the foldable display in full screen when detecting that the foldable display is in the unfolded state.

With reference to any one of the first aspect, the third aspect to the sixth aspect, and any embodiment of the first aspect and the third aspect to the sixth aspect, in some embodiments, the electronic device stops power supply to the second display or still displays an original user interface on the second display when displaying the first user interface on the first display.

With reference to any one of the first aspect, the third aspect to the sixth aspect, and any embodiment of the first aspect and the third aspect to the sixth aspect, in some embodiments, the electronic device stops power supply to the first display or still displays the first user interface on the first display when displaying the second user interface on the second display.

With reference to any one of the first aspect, the third aspect to the sixth aspect, and any embodiment of the first aspect and the third aspect to the sixth aspect, in some embodiments, the method further includes: The electronic device determines an area that is on the second display and that is not blocked by a hand of the user, detects that the electronic device is flipped over, and displays the second user interface in the area that is on the second display and that is not blocked by the hand of the user.

With reference to any one of the first aspect to the sixth aspect or any embodiment of the first aspect to the sixth aspect, in some embodiments, before the electronic device is flipped over, the first display faces the user, and the back of the second display faces the user; and after the electronic device is flipped over, the second display faces the user, and the back of the first display faces the user.

With reference to any one of the first aspect to the sixth aspect or any embodiment of the first aspect to the sixth aspect, in some embodiments, when a folding angle of the foldable display is less than a preset value, the foldable display is in the folded state; and when the folding angle of the foldable display is greater than the preset value, the foldable display is in the unfolded state. In some embodiments, an angle sensor may be disposed at a folding position of the foldable display, and the electronic device may detect the folding angle by using the angle sensor.

With reference to any one of the first aspect to the sixth aspect or any embodiment of the first aspect to the sixth aspect, in some embodiments, when it is detected that an angle at which the electronic device rotates in a direction in which the bottom of the first display vertically points to the top of the first display is greater than a first value, and that an acceleration of the electronic device in a direction perpendicular to a plane in which the first display is located is less than a second value, the electronic device is flipped over.

According to a seventh aspect, this application provides an electronic device, including one or more processors, a memory, and a foldable display. The foldable display includes a first display and a second display.

The memory and the foldable display are coupled to the one or more processors, the memory is configured to store computer program code, the computer program code includes computer instructions, and the one or more processors invoke the computer instructions, so that the electronic device performs the following operations:

detecting that the foldable display is in a folded state, and displaying a first user interface of a first application on the first display, where the first application is a reading application;

detecting whether the electronic device is flipped over; and when the electronic device is flipped over, displaying a second user interface of the first application on the second display, where the second user interface and the first user interface include same interface elements, and the second user interface and the first user interface are different in at least one of the following: a background color, a color of the displayed interface elements, or an arrangement manner of the interface elements.

According to an eighth aspect, this application provides an electronic device, including one or more processors, a memory, a foldable display, and a camera. The foldable display includes a first display and a second display, and the camera is disposed at the top of the second display.

The memory and the foldable display are coupled to the one or more processors, the memory is configured to store computer program code, the computer program code includes computer instructions, and the one or more processors invoke the computer instructions, so that the electronic device performs the following operations:

detecting that the foldable display is in a folded state, and displaying a first preview screen of a camera application on the first display, where the first preview screen includes an image that the camera captures in a direction of the second display;

detecting whether the electronic device is flipped over; and when the electronic device is flipped over, displaying a second preview screen of the camera application on the second display, where the second preview screen includes a face image captured by the camera.

With reference to the eighth aspect, in some embodiments, the face image displayed in the second preview screen has at least one of the following effects: a depth of field effect, a background blur effect, or a beauty effect.

With reference to the eighth aspect, in some embodiments, the processor is further configured to invoke the computer instructions, so that the electronic device performs the following operations: before detecting that the foldable display is in the folded state, detecting that the foldable display is in an unfolded state, and displaying a third preview screen of the camera application, where the third preview screen is displayed on both the first display and the second display, and the third preview screen includes the image that the camera captures in the direction of the second display. In some embodiments, the processor is configured to invoke the computer instructions, so that the electronic device displays the third preview screen of the camera application on the foldable display in full screen.

With reference to the eighth aspect, in some embodiments, the processor is configured to invoke the computer instructions, so that the electronic device stops power supply to the second display or still displays an original user interface on the second display when displaying the first preview screen of the camera application on the first display.

With reference to the eighth aspect, in some embodiments, the processor is configured to invoke the computer instructions, so that the electronic device stops power supply to the first display or still displays the first preview screen on the first display when displaying the second preview screen of the camera application on the second display.

With reference to the eighth aspect, in some embodiments, the processor is further configured to invoke the computer instructions, so that the electronic device determines an area that is on the second display and that is not blocked by a hand of a user, and when detecting that the electronic device is flipped over, the electronic device displays the second preview screen in the area that is on the second display and that is not blocked by the hand of the user.

According to a ninth aspect, this application provides an electronic device, including one or more processors, a memory, a foldable display, a first camera, and a second camera. The foldable display includes a first display and a second display, an aspect ratio of the second display is less than an aspect ratio of the first display, the first camera is disposed at the top of the first display, and the second camera is disposed at the top of the second display.

The memory and the foldable display are coupled to the one or more processors, the memory is configured to store computer program code, the computer program code includes computer instructions, and the one or more processors invoke the computer instructions, so that the electronic device performs the following operations:

detecting that the foldable display is in a folded state, and displaying a first user interface of a first application on the first display, where the first application is a video call application, the first user interface includes an image captured by the first camera and an image of the other party in a video call, and the image captured by the first camera overlaps the image of the other party in the video call;

detecting whether the electronic device is flipped over; and when the electronic device is flipped over, displaying a second user interface of the first application on the second display, where the second user interface includes an image captured by the second camera and an image of the other party in the video call, and the image captured by the second camera does not overlap the image of the other party in the video call.

With reference to the ninth aspect, in some embodiments, the processor is further configured to invoke the computer instructions, so that the electronic device performs the following operations: before detecting that the foldable display is in the folded state, detecting that the foldable display is in an unfolded state, and displaying a third user interface of the first application, where the third user interface is displayed on both the first display and the second display, and the third user interface is the enlarged first user interface. In some embodiments, the processor is configured to invoke the computer instructions, so that the electronic device displays the third user interface of the first application on the foldable display in full screen.

According to a tenth aspect, this application provides an electronic device, including one or more processors, a memory, and a foldable display. The foldable display includes a first display and a second display.

The memory and the foldable display are coupled to the one or more processors, the memory is configured to store computer program code, the computer program code includes computer instructions, and the one or more processors invoke the computer instructions, so that the electronic device performs the following operations:

detecting that the foldable display is in a folded state, and displaying a first user interface on the first display;

detecting whether the electronic device is flipped over; and when the electronic device is flipped over, displaying a second user interface of the first application on the second display, where the first application is a ride-hailing application, and the second user interface includes trip order information provided by the ride-hailing application; or the first application is a navigation application, and the second user interface is a navigation interface provided by the navigation application.

According to an eleventh aspect, this application provides an electronic device, including one or more processors, a memory, and a foldable display. The foldable display includes a first display and a second display.

The memory and the foldable display are coupled to the one or more processors, the memory is configured to store computer program code, the computer program code includes computer instructions, and the one or more processors invoke the computer instructions, so that the electronic device performs the following operations:

detecting that the foldable display is in a folded state, and displaying a first user interface on the first display;

detecting whether the electronic device is flipped over; and when the electronic device is flipped over, displaying a second user interface of the first application on the second display, where the first user interface includes notification information of a new message received by the first application, the second user interface includes specific content of the new message, and an amount of information included in the specific content of the new message is greater than an amount of information included in the notification information of the new message.

According to a twelfth aspect, this application provides an electronic device, including one or more processors, a memory, and a foldable display. The foldable display includes a first display and a second display.

The memory and the foldable display are coupled to the one or more processors, the memory is configured to store computer program code, the computer program code includes computer instructions, and the one or more processors invoke the computer instructions, so that the electronic device performs the following operations:

detecting that the foldable display is in a folded state, and displaying a first user interface on the first display;

obtaining a current location of the electronic device;

detecting whether the electronic device is flipped over; and when the electronic device is flipped over, displaying a second user interface on the second display, where the second user interface is associated with the current location of the electronic device.

With reference to the twelfth aspect, in some embodiments, when the electronic device is located in a subway station, the second user interface includes a subway ride code, or the second user interface is an NFC bus card swiping interface.

With reference to the twelfth aspect, in some embodiments, the electronic device is located in a shopping mall, the second user interface includes a payment code, or the second user interface is an NFC bank card payment interface.

With reference to the twelfth aspect, in some embodiments, when a distance between the location of the electronic device and a parcel locker is less than a preset value, the second user interface includes a parcel pickup code.

With reference to the twelfth aspect, in some embodiments, the processor is further configured to invoke computer instructions, so that the electronic device performs the following operations: receiving verification information entered by a user; and displaying the second user interface on the second display when the received verification information entered by the user is consistent with verification information prestored in the electronic device.

With reference to the seventh aspect, any embodiment of the seventh aspect, the tenth aspect, any embodiment of the tenth aspect, the eleventh aspect, any embodiment of the eleventh aspect, the twelfth aspect, or any embodiment of the twelfth aspect, in some embodiments, the processor is further configured to invoke the computer instructions, so that the electronic device performs the following operations: before detecting that the foldable display is in the folded state, detecting that the foldable display is in an unfolded state, and displaying a third user interface, where the third user interface is displayed on both the first display and the second display, and content displayed in the third user interface includes content displayed in the first user interface. In some embodiments, the processor is configured to invoke the computer instructions, so that the electronic device displays the third user interface on the foldable display in full screen.

With reference to any one of the seventh aspect, the ninth aspect to the twelfth aspect, and any embodiment of the seventh aspect and the ninth aspect to the twelfth aspect, in some embodiments, the processor is further configured to invoke the computer instructions, so that the electronic device stops power supply to the second display or still displays an original user interface on the second display when displaying the first user interface on the first display.

With reference to any one of the seventh aspect, the ninth aspect to the twelfth aspect, and any embodiment of the seventh aspect and the ninth aspect to the twelfth aspect, in some embodiments, the processor is further configured to invoke the computer instructions, so that the electronic device stops power supply to the first display or still displays the first user interface on the first display when displaying the second user interface of the first application on the second display.

With reference to any one of the seventh aspect, the ninth aspect to the twelfth aspect, and any embodiment of the seventh aspect and the ninth aspect to the twelfth aspect, in some embodiments, the processor is further configured to invoke the computer instructions, so that the electronic device determines an area that is on the second display and that is not blocked by a hand of the user, and when the electronic device is flipped over, displays the second user interface in the area that is on the second display and that is not blocked by the hand of the user.

With reference to any one of the seventh aspect to the twelfth aspect, and any embodiment of the seventh aspect to the twelfth aspect, in some embodiments, before the electronic device is flipped over, the first display faces the user, and the back of the second display faces the user; and after the electronic device is flipped over, the second display faces the user, and the back of the first display faces the user.

According to a thirteenth aspect, an embodiment of this application provides a computer storage medium including computer instructions. When the computer instructions are run on an electronic device, the electronic device is enabled to perform the display method according to the first aspect.

According to a fourteenth aspect, an embodiment of this application provides a computer storage medium including computer instructions. When the computer instructions are run on an electronic device, the electronic device is enabled to perform the display method according to the second aspect.

According to a fifteenth aspect, an embodiment of this application provides a computer storage medium including computer instructions. When the computer instructions are run on an electronic device, the electronic device is enabled to perform the display method according to the third aspect.

According to a sixteenth aspect, an embodiment of this application provides a computer storage medium including computer instructions. When the computer instructions are run on an electronic device, the electronic device is enabled to perform the display method according to the fourth aspect.

According to a seventeenth aspect, an embodiment of this application provides a computer storage medium including computer instructions. When the computer instructions are run on an electronic device, the electronic device is enabled to perform the display method according to the fifth aspect.

According to an eighteenth aspect, an embodiment of this application provides a computer storage medium including computer instructions. When the computer instructions are run on an electronic device, the electronic device is enabled to perform the display method according to the sixth aspect.

According to a nineteenth aspect, this application provides a computer program product. When the computer program product is run on a computer, the computer is enabled to perform the display method according to the first aspect.

According to a twentieth aspect, this application provides a computer program product. When the computer program product is run on a computer, the computer is enabled to perform the display method according to the second aspect.

According to a twenty-first aspect, this application provides a computer program product. When the computer program product is run on a computer, the computer is enabled to perform the display method according to the third aspect.

According to a twenty-second aspect, this application provides a computer program product. When the computer program product is run on a computer, the computer is enabled to perform the display method according to the fourth aspect.

According to a twenty-third aspect, this application provides a computer program product. When the computer program product is run on a computer, the computer is enabled to perform the display method according to the fifth aspect.

According to a twenty-fourth aspect, this application provides a computer program product. When the computer program product is run on a computer, the computer is enabled to perform the display method according to the sixth aspect.

According to a twenty-fifth aspect, this application provides an electronic device, including a functional unit configured to perform the display method according to the first aspect.

According to a twenty-sixth aspect, this application provides an electronic device, including a functional unit configured to perform the display method according to the second aspect.

According to a twenty-seventh aspect, this application provides an electronic device, including a functional unit configured to perform the display method according to the third aspect.

According to a twenty-eighth aspect, this application provides an electronic device, including a functional unit configured to perform the display method according to the fourth aspect.

According to a twenty-ninth aspect, this application provides an electronic device, including a functional unit configured to perform the display method according to the fifth aspect.

According to a thirtieth aspect, this application provides an electronic device, including a functional unit configured to perform the display method according to the sixth aspect.

According to this application, the user can trigger, in an interaction manner of flipping over the electronic device, the electronic device to display, on the second display with reference to a currently running application or a current location, content that the user expects to view, to take full advantage of a plurality of displays to provide a convenient interaction manner for the user. This is easy to operate and can improve user experience.

BRIEF DESCRIPTION OF THE DRAWINGS

To describe the technical solutions in the embodiments of this application or in the background more clearly, the following describes the accompanying drawings for describing the embodiments of this application or the background.

FIG. 4a to FIG. 15 are schematic diagrams of human-computer interaction according to this application.

DETAILED DESCRIPTION OF ILLUSTRATIVE EMBODIMENTS

The following describes the technical solutions in the embodiments of this application with reference to the accompanying drawings in the embodiments of this application.

In descriptions of the embodiments of this application, "/" means "or" unless otherwise specified. For example, A/B may represent A or B. In this specification, "and/or" describes only an association for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

A display method in the embodiments of this application may be applied to an electronic device. A type of the described electronic device is not specifically limited in this application. The electronic device may be a portable electronic device such as a mobile phone, a tablet computer, a personal digital assistant (personal digital assistant, PDA), a wearable device, or a laptop (laptop). An example embodiment of the portable electronic device includes but is not limited to a portable electronic device using iOS, Android, Microsoft, or another operating system. The portable electronic device may alternatively be another portable electronic device, for example, a laptop (laptop) with a touch-sensitive surface (for example, a touch panel). It should be further understood that, in some other embodiments of this application, the electronic device may alternatively be a desktop computer with a touch-sensitive surface (for example, a touch panel), but not a portable electronic device.

Figure 1:
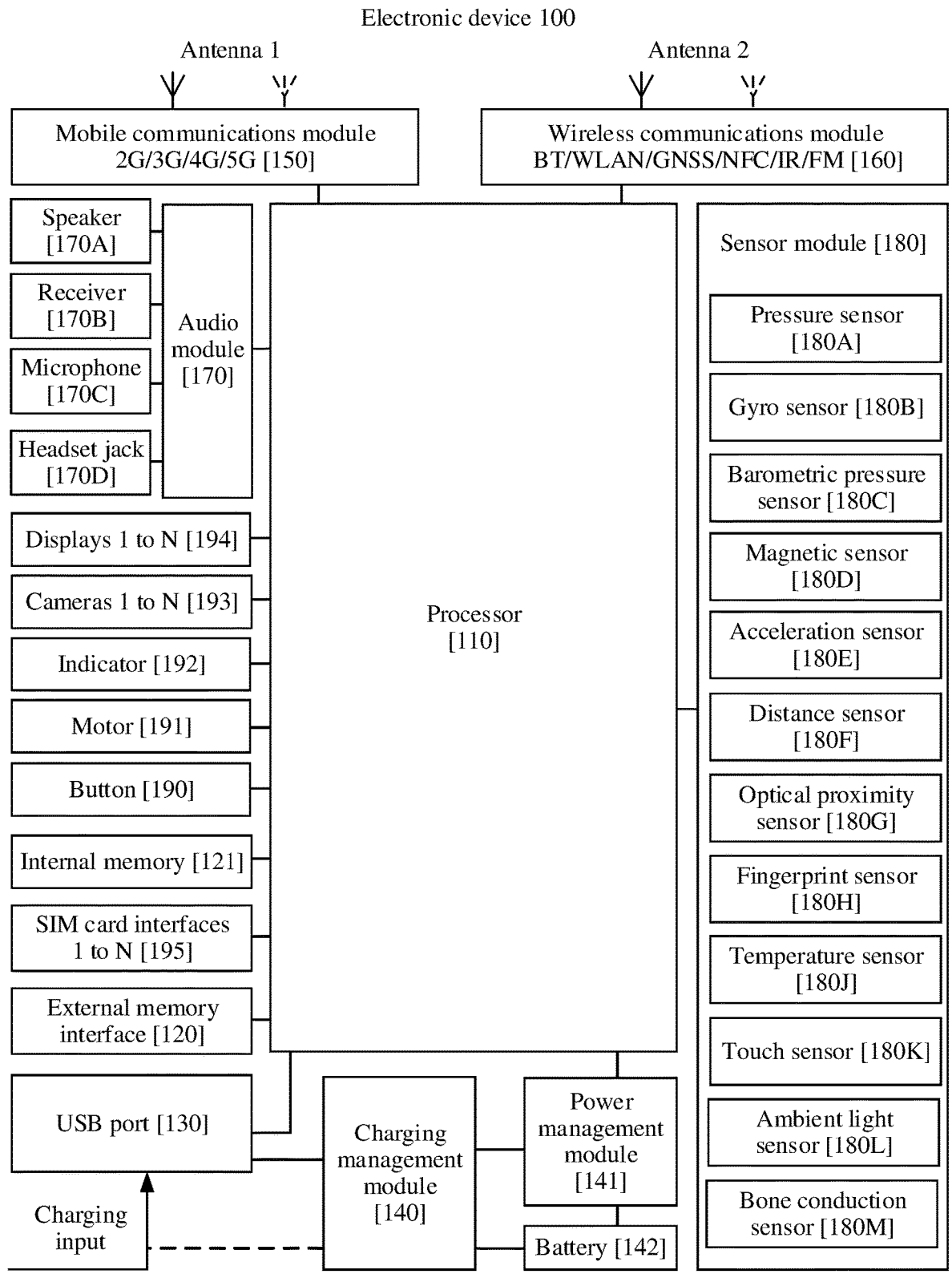
FIG. 1 is a schematic structural diagram of an electronic device according to this application.

FIG. 1 is a schematic structural diagram of an electronic device 100 according to an embodiment of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a time sequence signal, to control to read instructions and execute instructions.

A memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor 110 may directly invoke the instructions or the data from the memory, to avoid repeated access. This reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) port, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through an I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a USB Type C port, or the like. The USB port 130 may be configured to connect to the charger to charge the electronic device 100, or may be configured to transmit data between the electronic device 100 and a peripheral device, or may be configured to connect to a headset to play audio by using the headset, or may be configured to connect to another electronic device such as an AR device.

It may be understood that an interface connection relationship between the modules shown in the embodiments of the present invention is merely used as an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB port 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 receives an input from the battery 142 and/or the charging management module 140, and supplies power to the processor 110, the internal memory 121, the display 194, the camera 193, the wireless communications module 160, and the like. The power management module 141 may further be configured to monitor parameters such as battery power, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 each are configured to transmit and receive an electromagnetic wave signal. Each antenna in the electronic device 100 may be configured to cover one or more communications bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution, for example, including 2G/3G/4G/5G wireless communication, that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transferred to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation. In some embodiments of this application, the electronic device may obtain current location information by using the wireless communications module 160. In some other embodiments of this application, the electronic device may provide a payment function such as an NFC bank card payment function or an NFC bus card ride function by using the wireless communications module 160.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or satellite based augmentation systems (satellite based augmentation systems, SBAS). In some embodiments of this application, the electronic device may obtain current location information by using the mobile communications module 150.

The electronic device 100 implements a display function by using the GPU, the display 194, the application processor, and the like. The GPU is a microprocessor for image processing, and connects the display 194 to the application processor. The GPU is configured to perform mathematical and geometric calculation, and perform graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), mini-LED, a micro-LED, a micro-OLED, a quantum dot light-emitting diode (quantum dot light-emitting diodes, QLED), or the like. In some embodiments, the electronic device 100 may include one or N displays 194, where N is a positive integer greater than 1.

Figure 2A:
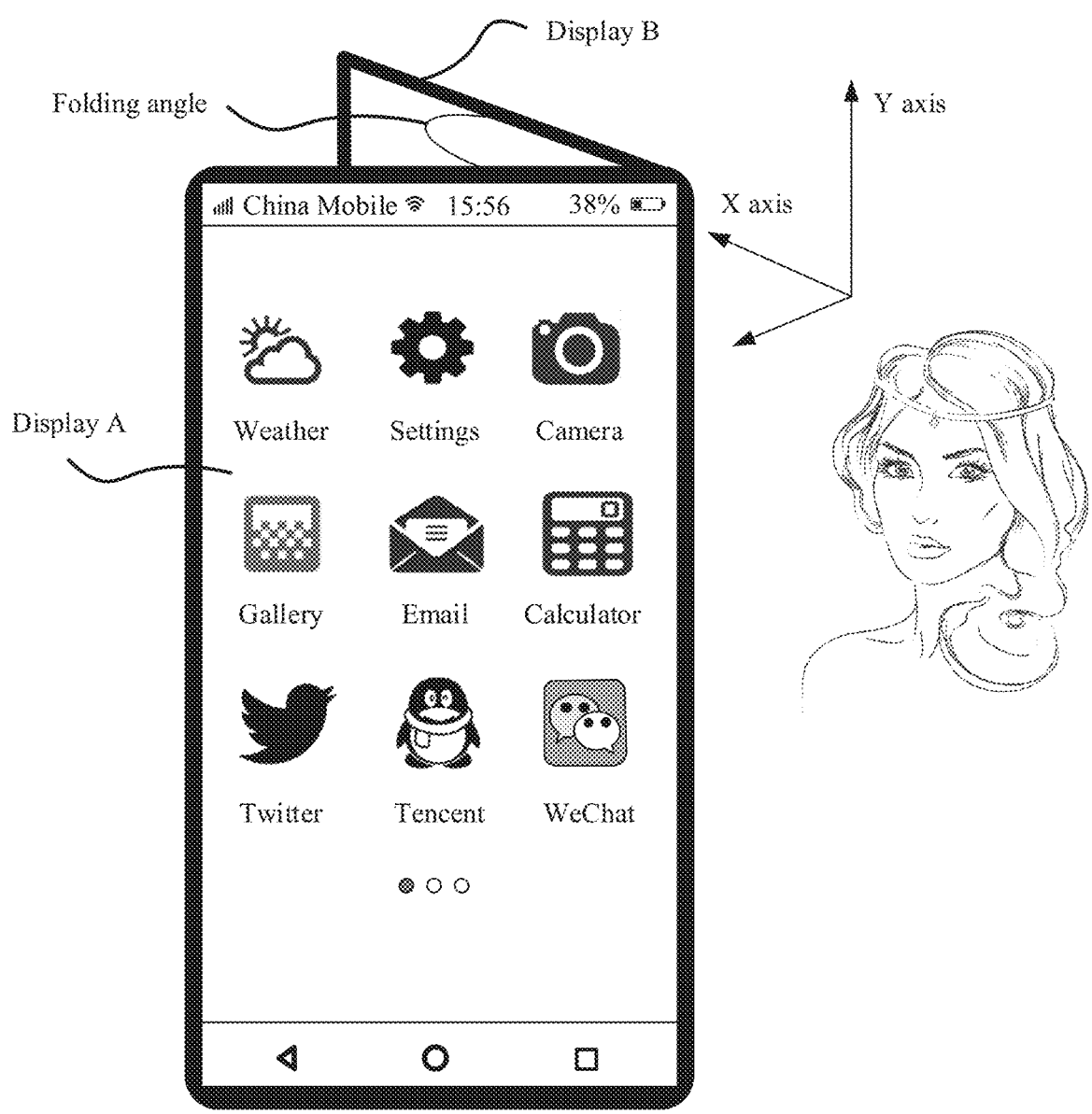
FIG. 2a and FIG. 2b are schematic diagrams of displays disposed on an electronic device according to this application.

In some embodiments of this application, when the display panel is made of a material such as the OLED, the AMOLED, or the FLED, the display 194 may be folded. In other words, the electronic device 100 may be provided with a foldable display. Herein, that the display 194 may be folded means that the display may be folded to any angle at a fixed part or any part and may be maintained at the angle. The foldable display has two states: an unfolded state and a folded state. When a folding angle formed when the foldable display is folded is greater than a preset value, it may be considered that the foldable display is in the unfolded state; or when a folding angle formed when the foldable display is folded is less than a preset value, it may be considered that the foldable display is in the folded state. The folding angle may be an angle formed at a folding part on a side that is of the foldable display and that is not used to display content. As shown in FIG. 2*a*, a side that is of the foldable display and that faces a user is used to display content, and a folding angle is shown in the figure. The preset value may be predefined, for example, may be 90 degrees or 80 degrees. In some embodiments, an angle sensor may be disposed at a folding position of the foldable display, and the electronic device may detect the folding angle by using the angle sensor, and determines, based on the folding angle, whether the foldable display is in the unfolded state or the folded state. For example, referring to FIG. 2*a*, the display 194 may be folded from the middle, and the folded display may be divided into a display A and a display B. When the electronic device 100 is provided with the foldable display, and the foldable display is in the folded state, it may be considered that the electronic device 100 provides two displays.

When the foldable display is in the unfolded state, a user interface provided by an operating system of the electronic device may be displayed in full screen. The full-screen display of the user interface may mean that the user interface occupies all display areas of the foldable display, or may mean that the user interface occupies most display areas of the display. For example, when the foldable display is a notched display (Notch display), a middle part of the notched display displays the user interface. When a black screen occurs on one side or both sides of the display, it may also be considered that the foldable display displays the user interface in full screen.

When the foldable display is in the folded state, the electronic device may display, on only one display of the foldable display, the user interface provided by the operating system, or may display, on both displays of the foldable display, the user interface provided by the operating system of the electronic device. This is not limited in the embodiments of this application.

In some embodiments, when the foldable display changes from the unfolded state to the folded state, the electronic device may change from displaying the user interface on the foldable display in full screen to displaying the user interface on one display of the foldable display.

Figure 2B:
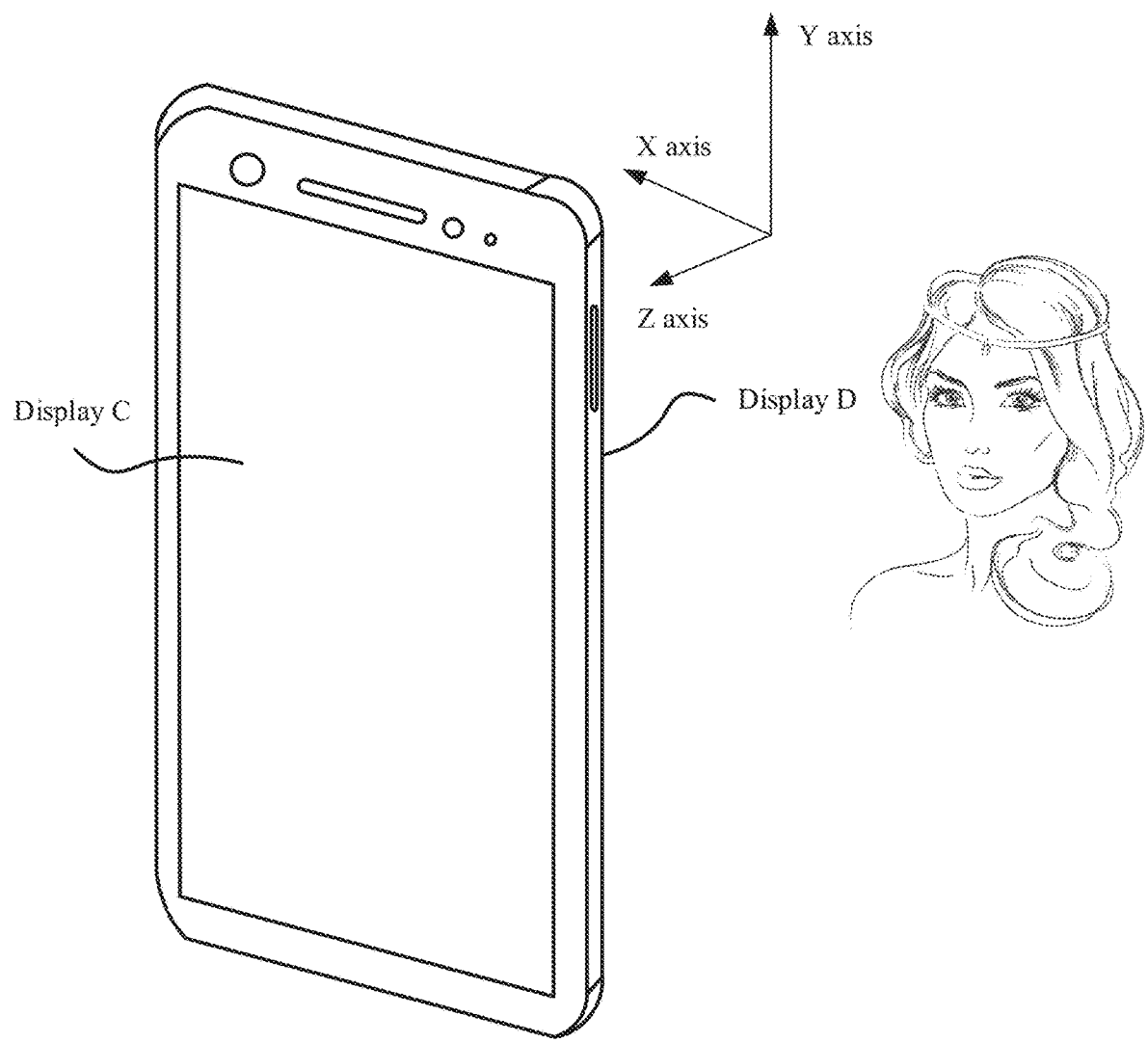

In some other embodiments of this application, the electronic device 100 may be provided with two independent displays, and the two displays are located on two sides of the electronic device 100 respectively. For example, FIG. 2*b* shows an electronic device provided with two displays (namely, a display C and a display D in the figure). When the electronic device 100 is provided with two displays, the two displays may have a same configuration, or may have different configurations. For example, the two displays may be made of a same material or different materials, and may have a same size or different sizes. For example, one display is a 6-inch OLED display, and the other display is a 5-inch LCD display. This is not limited in the embodiments of this application.

In the embodiments of this application, when the electronic device provides two displays, one of the displays may be referred to as a first display, and the other display may be referred to as a second display. For example, referring to FIG. 2*a*, a display B may be considered as the first display, and a display A may be considered as the second display. For example, referring to FIG. 2*b*, a display D may be considered as the first display, and a display C may be considered as the second display.

The electronic device 100 may implement a shooting function by using the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eye. The ISP may further perform algorithm optimization on noise, brightness, and complexion of the image. The ISP may further optimize parameters such as exposure and color temperature of a shooting scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP. The ISP converts the electrical signal into a digital image signal, and outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. Therefore, the electronic device 100 may play or record videos in a plurality of coding formats, for example, MPEG (moving picture experts group, MPEG)-1, MPEG-2, MPEG-3, and MPEG-4.

The NPU is a neural-network (neural-network, NN) computing processor. The NPU quickly processes input information by referring to a biological neural network structure, for example, by referring to a mode of transfer between human brain neurons, and may further continuously perform self-learning. The electronic device 100 may implement intelligent cognition such as image recognition, facial recognition, speech recognition, and text understanding through the NPU.

The external memory interface 120 may be configured to connect to an external memory card such as a micro SD card, to extend a storage capability of the electronic device 100. The external memory card communicates with the processor 110 through the external memory interface 120, to implement a data storage function, for example, to store files such as music and a video in the external memory card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data and a phone book) created during use of the electronic device 100, and the like. In addition, the internal memory 121 may include a high-speed random access memory, or may include a nonvolatile memory, for example, at least one magnetic disk storage device, a flash memory device, or a universal flash storage (universal flash storage, UFS). The processor no runs the instructions stored in the internal memory 121 and/or the instructions stored in the memory disposed in the processor, to execute various function applications of the electronic device 100 and data processing.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to perform audio signal encoding and decoding. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice.

The microphone 170C, also referred to as a "mike" or a "microphone", is configured to convert a sound signal into an electrical signal. When making a call or sending a voice message, a user may make a sound near the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, reduce a noise, identify a sound source, implement a directional recording function, and the like.

The headset interface 170D is configured to connect to a wired headset. The headset jack 170D may be the USB port 130 or a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A such as a resistive pressure sensor, an inductive pressure sensor, and a capacitive pressure sensor. The capacitive pressure sensor may include at least two parallel plates made of conductive materials. Capacitance between electrodes changes when force is applied to the pressure sensor 180A. The electronic device 100 determines pressure intensity based on a change of the capacitance. When a touch operation is performed on the display 194, the electronic device 100 detects a strength of the touch operation based on the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed. In some other embodiments of this application, the pressure sensor 180A may be further disposed on a frame of the electronic device 100. The electronic device 100 may calculate, by using pressure detected by the pressure sensor 180A, a touch point at which the user touches the electronic device 100.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during shooting. For example, when the shutter is pressed, the gyro sensor 180B detects an angle at which the electronic device 100 jitters, and calculates, based on the angle, a distance for which a lens module needs to compensate, and allows the lens to eliminate the jitter of the electronic device 100 through a reverse motion, to implement image stabilization. The gyroscope sensor 180B may be further used in a navigation scenario and a somatic game scenario. In some embodiments of this application, the electronic device 100 may determine, by using the gyro sensor 180B, whether the electronic device is flipped over by the user, whether the electronic device is in a vertical posture, and the like.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D, to set a feature such as automatic unlocking through flipping based on a detected opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to applications such as a pedometer and switching between a landscape mode and a portrait mode. In some embodiments of this application, the electronic device 100 may determine, by using the acceleration sensor 180E, whether the electronic device is flipped over by the user, whether the electronic device is in a vertical posture, and the like.

The distance sensor 180F is configured to measure a distance. The electronic device 100 may measure the distance in an infrared manner or a laser manner. In some embodiments, in a shooting scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call. In this case, the electronic device 100 automatically turns off the screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during shooting. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation acting on or near the touch sensor 180K. The touch sensor may transfer the detected touch operation to the application processor, to determine a type of a touch event. The display 194 provides a visual output related to the touch operation. In some other embodiments, the touch sensor 180K may alternatively be disposed on a surface of the electronic device 100 in a position different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, which may be used to indicate a charging status and a power change, or may be used to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into one SIM card interface 195. The plurality of cards may be in a same type or of different types. The SIM card interface 195 may also be compatible with different types of SIM cards. The SIM card interface 195 may also be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a micro-kernel architecture, a micro service architecture, or a cloud architecture. In the embodiments of this application, an Android system with a layered architecture is used as an example to describe a software structure of the electronic device 100.

Figure 3:
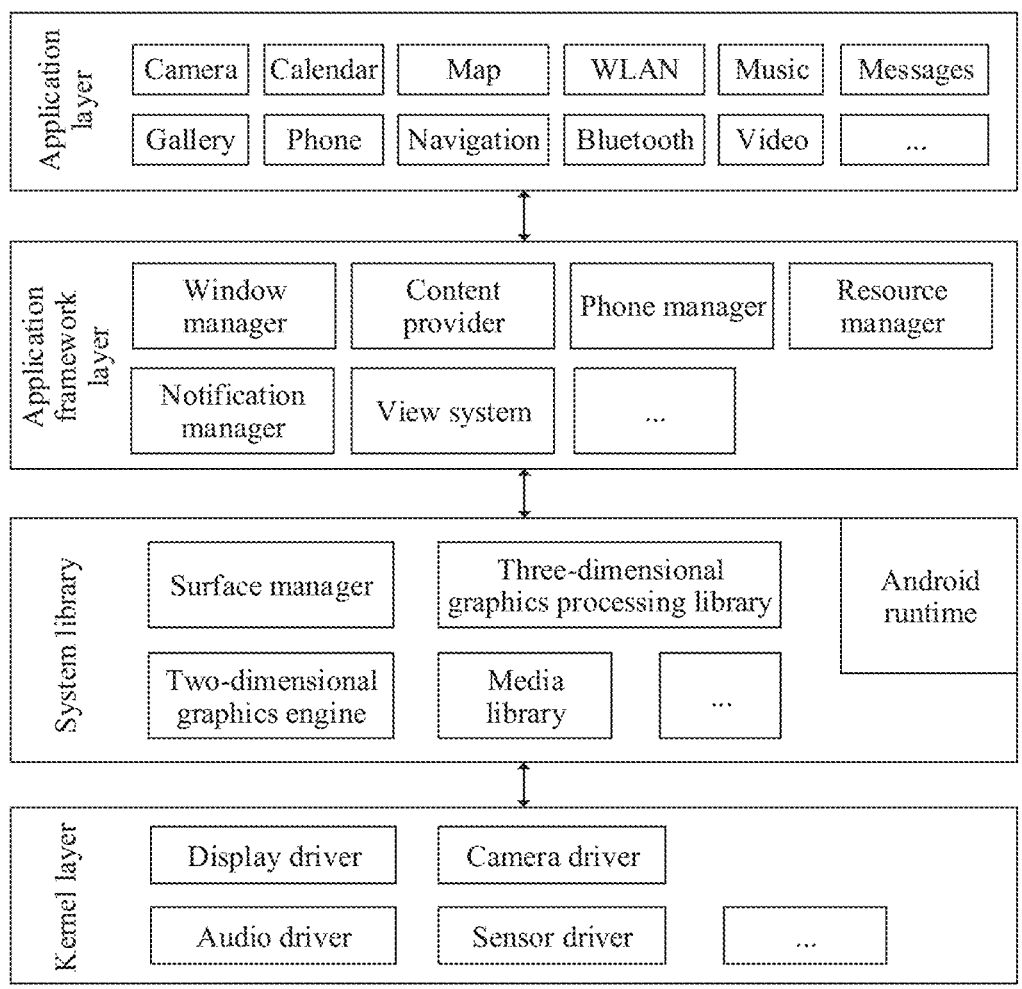
FIG. 3 is a block diagram of a software structure of an electronic device according to this application.

FIG. 3 is a block diagram of the software structure of the electronic device 100 in this embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3, the application packages may include applications such as "camera", "gallery", "calendar", "calls", "maps", "navigation", "WLAN", "Bluetooth", "music", "videos", and "messaging".

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like. In the embodiments of this application, the window manager may obtain screen sizes of the two displays provided by the electronic device 100, and jointly manage content displayed on the two displays.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying text and a control for displaying an image. The view system may be configured to construct an application. A display interface may include one or more views. For example, a display interface including a Messages notification icon may include a text display view and an image display view.

The phone manager is configured to provide a communication function of the electronic device 100, for example, management of a call status (including answering or declining).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the display in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a shooting scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch tap operation, and a control corresponding to the tap operation is a control of a camera application icon is used. The camera application invokes an interface at the application framework layer to enable the camera application, then enables a camera driver by invoking the kernel layer, and captures a static image or a video by using the camera 193.

Based on the electronic device 100 shown in FIG. 1, the embodiments of this application provide a display method. The electronic device 100 in the embodiments of this application includes two displays: a first display and a second display. For example, referring to FIG. 2a, the first display may be a display B, and the second display may be a display A. For another example, referring to FIG. 2b, the first display may be a display D, and the second display may be a display C.

According to the display method in the embodiments of this application, a user may trigger, through interaction of flipping over the electronic device, the second display to display content that the user expects to view. This is easy to operate and can improve user experience. Flipping over the electronic device means exchanging locations of the first display and the second display relative to the user. For example, referring to FIG. 2a, when a foldable display is in a folded state, the first display (that is, the display B) faces the user, and the back of the second display (that is, the display A) faces the user. After the user flips over the electronic device, the back of the first display faces the user, and the second display faces the user. For another example, referring to FIG. 2b, the first display (that is, the display D) faces the user, and the back of the second display (that is, the display C) faces the user. After the user flips over the electronic device, the back of the first display faces the user, and the second display faces the user. Herein, when the user holds the electronic device, if the user can see content displayed on a display, it may be considered that the display faces the user, and if the user cannot see content displayed on a display, it may be considered that the back of the display faces the user.

Specifically, when the electronic device is provided with the foldable display and the foldable display is in the folded state, or when the electronic device is provided with two independent displays, the user may flip over the electronic device, to trigger the electronic device to display corresponding content on the second display with reference to a current location, a currently started application, and the like. The following describes the display method provided in the embodiments of this application in different cases.

(1) The user flips over the electronic device, to trigger the electronic device to display corresponding content on the second display with reference to the currently started application.

In the case (1), the application currently started by the electronic device may be a reading application, a camera (camera) application, or the like. The following describes the display method provided in the embodiments of this application with reference to specific application scenarios.

Application scenario 1: The electronic device 100 starts a reading application, and displays, on the first display, a user interface provided by the reading application. The user may flip over the electronic device 100, to trigger the electronic device 100 to display, on the second display, a user interface provided by the reading application. In this embodiment of this application, the reading application may be referred to as a first application.

The reading application is an application that provides information such as text and pictures for the user to read. The pictures may include a static picture and a dynamic picture. For example, the reading application may include Kindle, WeChat Reading, Douban Reading, Weibo, Zhihu, Jianshu, or Toutiao.

For example, FIG. 4a shows a user interface 10 that is provided by the reading application and that is displayed on the first display when the electronic device 100 starts the reading application (for example, Kindle). In the example shown in FIG. 4a, the first display faces the user, and the back of the second display faces the user. The user interface 10 may include text 101 provided by the reading application, a back-to-previous control 102, a comment text box 103, a favorites control 104, a share control 105, and the like. In some embodiments, the user interface 10 may further include a status bar 106. The status bar 106 may include one or more of the following: an operator name (for example, China Mobile), a Wi-Fi icon, signal strength, time, a battery icon, a remaining battery level, an alarm clock icon (not shown in the figure), a Bluetooth icon (not shown in the figure), and the like. In this embodiment of this application, the user interface 10 displayed by the electronic device on the first display may be referred to as a first user interface.

In some embodiments, when the electronic device 100 is provided with a foldable display, the foldable display is in a folded state in the example shown in FIG. 4a. The folded state may change from an unfolded state. When the foldable display is in the unfolded state, the foldable display may display a user interface provided by the reading application, and the user interface is displayed on both the first display and the second display. In addition, content displayed in the user interface includes content (for example, content included in the user interface 10) of the user interface that is displayed on the first display when the foldable display is in the folded state. In some embodiments, when the foldable display is in the unfolded state, the user interface may be displayed in full screen. In some embodiments, the user interface that is displayed when the foldable display is in the unfolded state is the enlarged user interface that is displayed on the first display when the foldable display is in the folded state. In some other embodiments, the user interface that is displayed when the foldable display is in the unfolded state not only includes the content of the user interface that is displayed on the first display when the foldable display is in the folded state, but also may include other content, such as more text and controls. In this embodiment of this application, the user interface that is displayed when the foldable display is in the unfolded state may be referred to as a third user interface.

In some embodiments, when the electronic device 100 displays, on the first display, the user interface provided by the reading application, the second display may be in a black screen state or may display content. That the second display is in a black screen state may mean that the electronic device 100 turns off power supply to the second display, or may mean that the second display displays a black screen. This is not limited herein.

In this embodiment of this application, the user may flip over the electronic device 100, to exchange locations of the second display and the first display of the electronic device 100 relative to the user. For example, the user may flip over the electronic device 100 in a direction of an arrow shown in FIG. 4a and FIG. 4b. In other words, after the user flips over the electronic device 100, the second display faces the user, and the back of the first display faces the user. In response to the operation that the user flips over the electronic device, the electronic device 100 may display, on the second display, a user interface provided by the reading application.

During specific implementation, when the electronic device 100 is in the folded state, the electronic device 100 may detect, by using one or more of a gyro sensor, an acceleration sensor, or a gravity sensor, whether the electronic device 100 is flipped over. For example, the gyro sensor may detect an angle by which the electronic device rotates clockwise or counter-clockwise along a Y axis of a plane on which the electronic device is located. If the rotation angle is greater than a first value (for example, 150 degrees or 160 degrees), it is determined that the electronic device 100 is flipped over. Herein, the Y axis of the plane on which the electronic device is located is a direction pointing from the bottom of the first display to the top of the first display in a vertical direction of the display. For an example, refer to a Y axis shown in FIG. 2a and FIG. 2b. For another example, to avoid mistakenly considering that the electronic device 100 is flipped over when the user holds the electronic device 100 to adjust a facing direction (for example, the user holds the electronic device 100 and adjusts the facing direction from east facing to west facing), the acceleration sensor may further detect an acceleration of the electronic device along a Z axis of the electronic device. When the rotation angle is greater than the first value and the acceleration is less than a second value, it is determined that the electronic device 100 is flipped over. Herein, the Z axis is in a direction perpendicular to the plane on which the first display is located. For an example, refer to a Z axis shown in FIG. 2a and FIG. 2b.

In this embodiment of this application, one or more of the gyro sensor, the acceleration sensor, and the gravity sensor of the electronic device may continuously monitor a posture of the electronic device in real time.

Figure 4B:
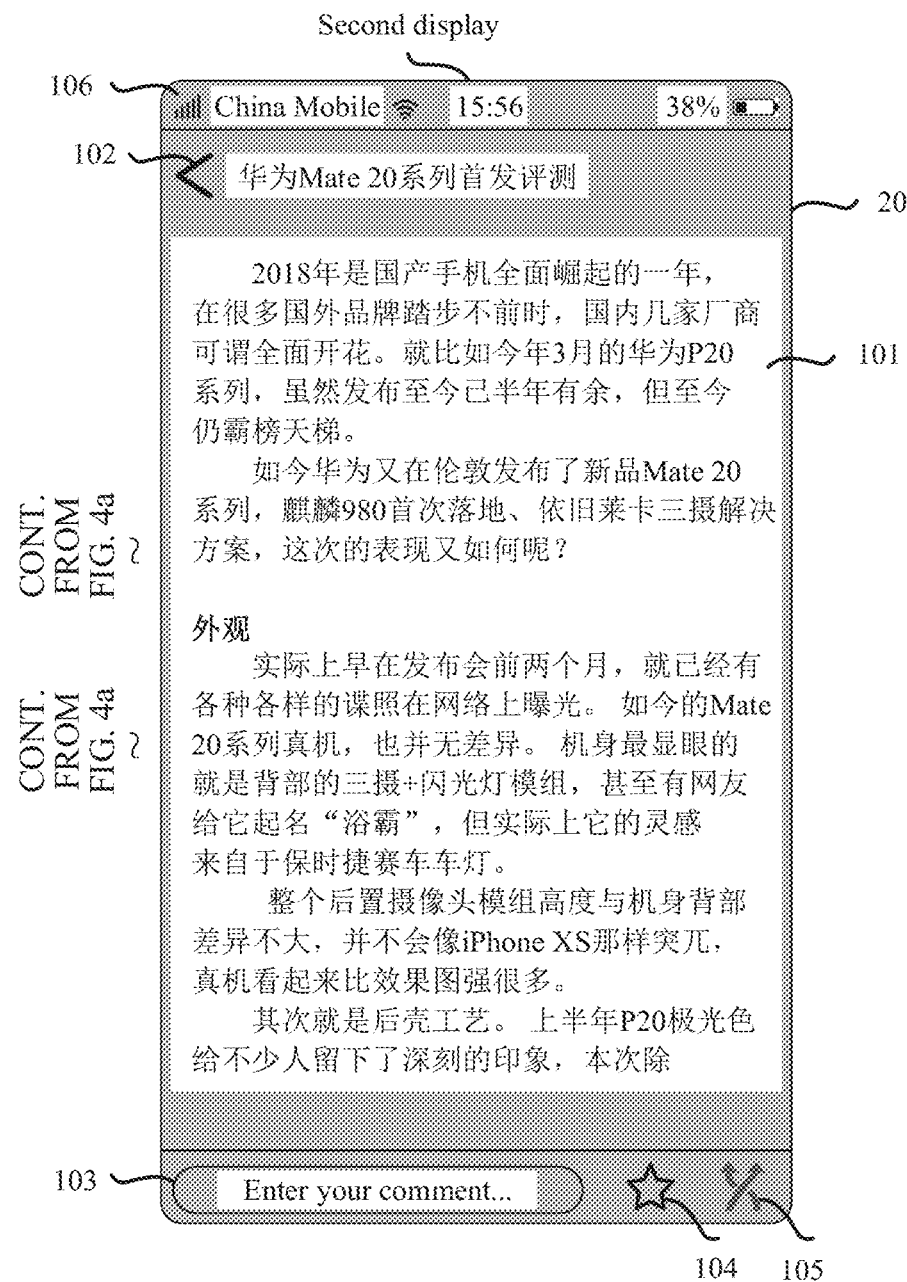

For example, FIG. 4b shows a user interface 20 that is provided by the reading application and that is displayed on the second display after the electronic device 100 detects the operation that the user flips over the electronic device. As shown in FIG. 4b, each interface element in the user interface 20 is the same as that in the user interface 10 in FIG. 4a. For details, refer to related descriptions in FIG. 4a. In this embodiment of this application, the user interface 20 that is displayed on the second display after the electronic device 100 is flipped over may be referred to as a second user interface.

It may be understood that, in some embodiments, configurations of the first display and the second display may be different. For example, screen sizes of the first display and the second display may be different. A screen size may include an area of a screen, a ratio of a width (width) to a height (height) of the screen, and the like. When the screen sizes of the first display and the second display are different, when the electronic device displays, on the second display, the user interface 20 provided by the reading application, compared with the user interface 10 provided by the reading application and displayed on the first display, an arrangement manner of the interface elements in the user interface 20 may be adaptively adjusted, to better meet a user habit and be more beautiful in display. For example, if the screen size of the second display is less than the screen size of the first display, a quantity of characters provided in the interface 20 displayed on the second display may be reduced, or the interface elements in the user interface 20 displayed on the second display may be scaled down proportionally. During actual application, the adaptively adjusting the interface elements displayed on the second display may further include adjusting a spacing between the interface elements, adjusting a display position of an interface element, and the like. This is not limited in this embodiment of this application.

In some embodiments, when the electronic device 100 displays the user interface 20 on the second display in response to the operation that the user flips over the electronic device, the user interface 20 may be further displayed in a form that is suitable for the user to read. Specifically, the electronic device 100 may adjust a background color of the user interface 20 to a dark color (for example, black), and adjust the interface elements in the user interface 20 to an appropriate color (for example, white). Such a display mode can save power, avoid dazzle during reading, and facilitate reading of the user. For example, FIG. 4b shows a possible manner in which the electronic device 100 displays the interface 20 in a form suitable for the user to read. A manner in which the electronic device 100 displays, on the second display, the user interface provided by the reading application after receiving the operation that the user flips over the electronic device may be set by the electronic device 100 by default or may be preset by the user. This is not limited herein.

In this embodiment of this application, when the electronic device 100 displays the user interface 20 on the second display in response to the operation that the user flips over the electronic device, the first display may display no content, for example, may enter a black screen state, or may still display the user interface 10. This is not limited herein. That the first display enters a black screen state may mean that the electronic device 100 stops power supply to the first display, or may mean that the first display displays a black screen. This is not limited herein. In some embodiments, when the first display still displays the user interface 10, the electronic device 100 may receive an entered user operation on the user interface 10 and make a response. In some other embodiments, when the first display still displays the user interface 10, the user interface 10 is locked. That is, the electronic device 100 can neither receive an entered user operation on the user interface 10 nor make a response. In this way, the user can be prevented from mistakenly triggering some functions of the electronic device 100 on the first display.

In some embodiments, after the electronic device 100 displays the user interface 20 on the second display in response to the operation that the user flips over the electronic device, the user may further flip over the electronic device 100 again, so that the electronic device 100 displays the user interface 10 on the first display. For example, the user may flip over the electronic device 100 again in a direction of an arrow shown in FIG. 4a and FIG. 4b. In other words, after the user flips over the electronic device 100 again, the first display faces the user, and the back of the second display faces the user. For example, referring to FIG. 4a, when detecting an operation that the user flips over the electronic device 100 again, the electronic device 100 may display the user interface 10 on the first display. When the electronic device 100 displays the user interface 10 on the first display, the second display may display no content, for example, may enter a black screen state, or may still display the user interface 20. This is not limited herein.

It can be learned from the example in FIG. 4a and FIG. 4b that when the electronic device displays, on the first display, a user interface provided by the reading application, the user may flip over the electronic device, to trigger the electronic device to display, on the second display, a user interface provided by the reading application. In addition, the second display may display the user interface in a form suitable for reading by the user, to improve user experience.

Application scenario 2: The electronic device 100 currently starts a camera application, and the first display displays a shooting interface. The user may flip over the electronic device 100, to trigger the electronic device 100 to display a selfie interface on the second display.

The camera application may be pre-installed on the electronic device 100, or may be downloaded through a network and installed on the electronic device 100. This is not limited herein.

In this embodiment of this application, the electronic device 100 may be provided with a group of cameras at the top of each of the first display and the second display, or may be provided with only one group of cameras at the top of the first display or the second display. A group of cameras may include one or more cameras.

Figure 5A:
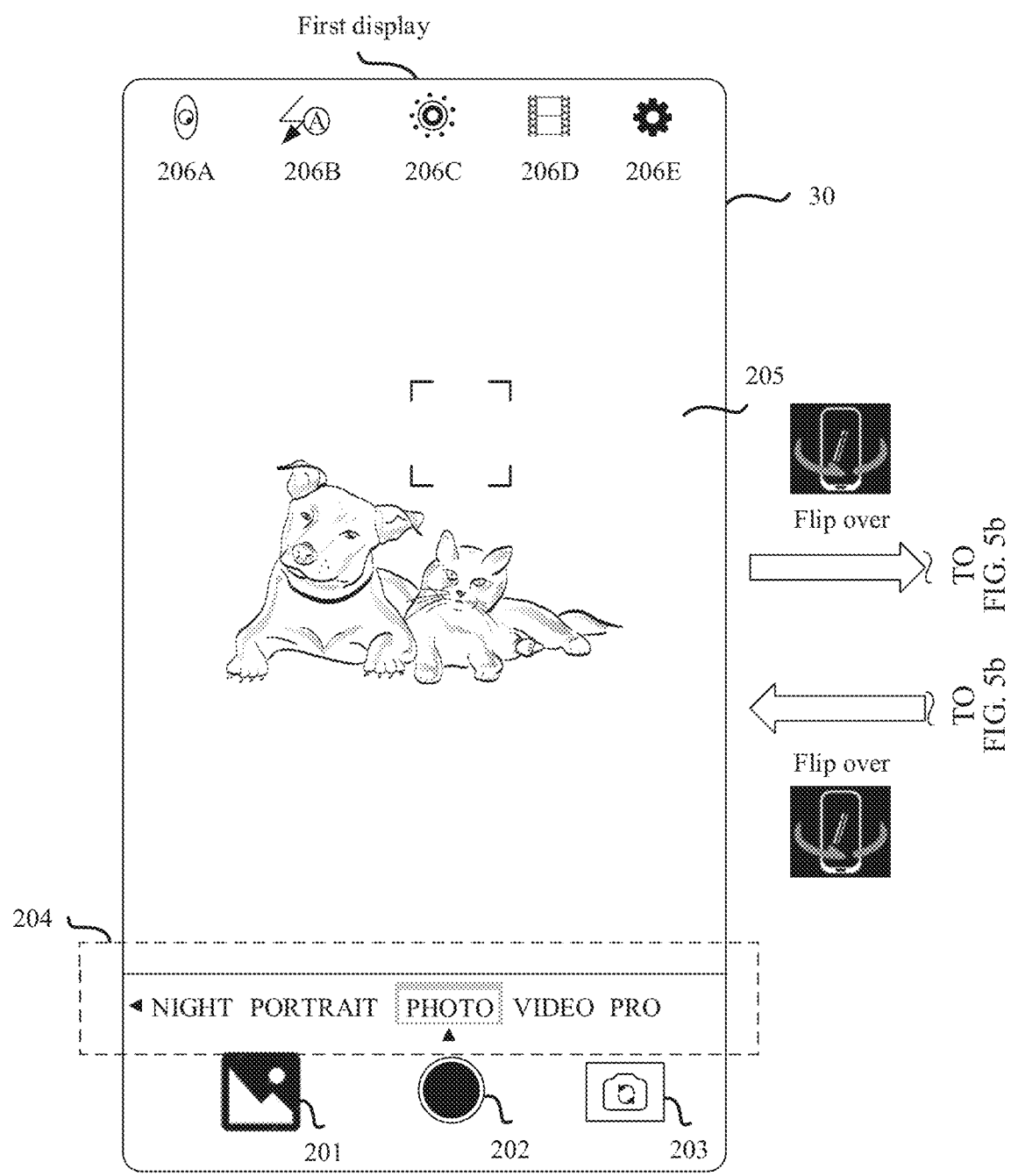

For example, FIG. 5a shows a shooting interface 30 that is displayed on the first display when the electronic device 100 currently starts the camera application (for example, the camera application pre-installed on the electronic device 100). In the example shown in FIG. 5a, the first display faces the user, and the back of the second display faces the user. For example, the shooting interface 30 may include a shot image redisplay control 201, a shooting control 202, a camera switching control 203, a shooting mode menu 204, a viewfinder 205, and some other controls such as a control 206A used to enable an object recognition function, a control 206B used to enable/disable a flash, a control 206C used to enable/disable a dynamic picture shooting function, a control 206D used to adjust a hue, and a setting control 206E.

The shot image redisplay control 201 may be used to display a most recently shot image of the electronic device 100, and may further monitor a user operation used to open an album. The electronic device 100 may detect a user operation (for example, a tap operation) performed on the control 201, open an album application in response to the user operation, and display a stored picture.

The shooting control 202 may monitor a user operation used to shoot an image. The electronic device may detect a user operation (for example, a tap operation) performed on the shooting control 202, determine a shot image in response to the operation, store the image, and display the image on the control 201. In other words, the user may tap the shooting control 202 to shoot an image.

The camera switching control 203 may monitor a user operation for switching between cameras. The electronic device 100 may detect a user operation (for example, a tap operation) performed on the control 203, and switch a currently enabled camera in response to the user operation. For example, the camera disposed at the top of the second display is disabled, and the camera disposed at the top of the first display is enabled.

The shooting mode menu 204 may display one or more shooting mode options. The shooting mode option may be implemented as icons, text, or another form. As shown in FIG. 5a, the shooting mode options in the shooting mode menu 204 may include an option of a wide aperture mode, an option of a night mode, an option of a portrait mode, an option of a shooting mode, an option of a video mode, an option of a pro mode, and the like.

The viewfinder 205 is used to display an image captured by a camera. The electronic device 100 may refresh displayed content in the viewfinder in real time. An image in the viewfinder 205 is an image that the electronic device 100 captures in a direction of the second display by using the camera disposed at the top of the second display.

In some embodiments, the shooting interface 30 may further include a navigation bar that can be hidden. The navigation bar may include a return button, a home screen button, and a recent button.

In this embodiment of this application, the shooting interface 30 displayed by the electronic device on the first display may be referred to as a first preview screen.

In some embodiments, when the electronic device 100 is provided with a foldable display, the foldable display is in a folded state in the example shown in FIG. 5a. The folded state may change from an unfolded state. When the foldable display is in the unfolded state, the foldable display may display a user interface provided by the camera application, and the user interface is displayed on both the first display and the second display. In addition, the user interface includes an image that the camera disposed at the top of the second display captures in the direction of the second display. In some embodiments, when the foldable display is in the unfolded state, the user interface provided by the camera application may be displayed in full screen. In this embodiment of this application, the user interface that is displayed when the foldable display is in the unfolded state may be referred to as a third preview screen.

In some embodiments, when the electronic device 100 displays, on the first display, the shooting interface provided by the camera application, the second display may be in a black screen state or may display content. That the second display is in a black screen state may mean that the electronic device 100 turns off power supply to the second display, or may mean that the second display displays a black screen. This is not limited herein.

In this embodiment of this application, the user may flip over the electronic device 100, to exchange locations of the second display and the first display of the electronic device 100 relative to the user. For example, the user may flip over the electronic device 100 in a direction of an arrow shown in FIG. 5a and FIG. 5b. After the user flips over the electronic device 100, the second display faces the user, and the back of the first display faces the user. Herein, for how the electronic device 100 detects the operation that the user flips over the electronic device, refer to related descriptions in the application scenario 1.

In the application scenario 2, the group of cameras disposed at the top of the second display of the electronic device 100 may continuously work to shoot images. After the user flips over the electronic device 100, because the second display faces the user, the group of cameras disposed at the top of the second display shoot an image of the user. The electronic device 100 may display, on the second display, the image of the user shot by the group of cameras disposed at the top of the second display, that is, display a selfie interface on the second display. That is, before the user flips over the electronic device 100, an image shot by the group of cameras disposed at the top of the second display is displayed on the first display, and after the user flips over the electronic device 100, an image shot by the group of cameras is displayed on the second display.

In this embodiment of this application, configurations of the first display and the second display may be the same or may be different. For example, screen sizes of the first display and the second display may be the same or may be different. When the screen sizes of the first display and the second display are the same, when the electronic device 100 displays a selfie interface on the second display, interface elements in the selfie interface may be arranged in a manner the same as interface elements in the shooting interface displayed on the first display. When the screen sizes of the first display and the second display are different, when the electronic device 100 displays the selfie interface on the second display, compared with the shooting interface displayed on the first display, the arrangement manner of the interface elements in the selfie interface may be adaptively adjusted, to better meet a user habit and be more beautiful in display.

Figure 5B:
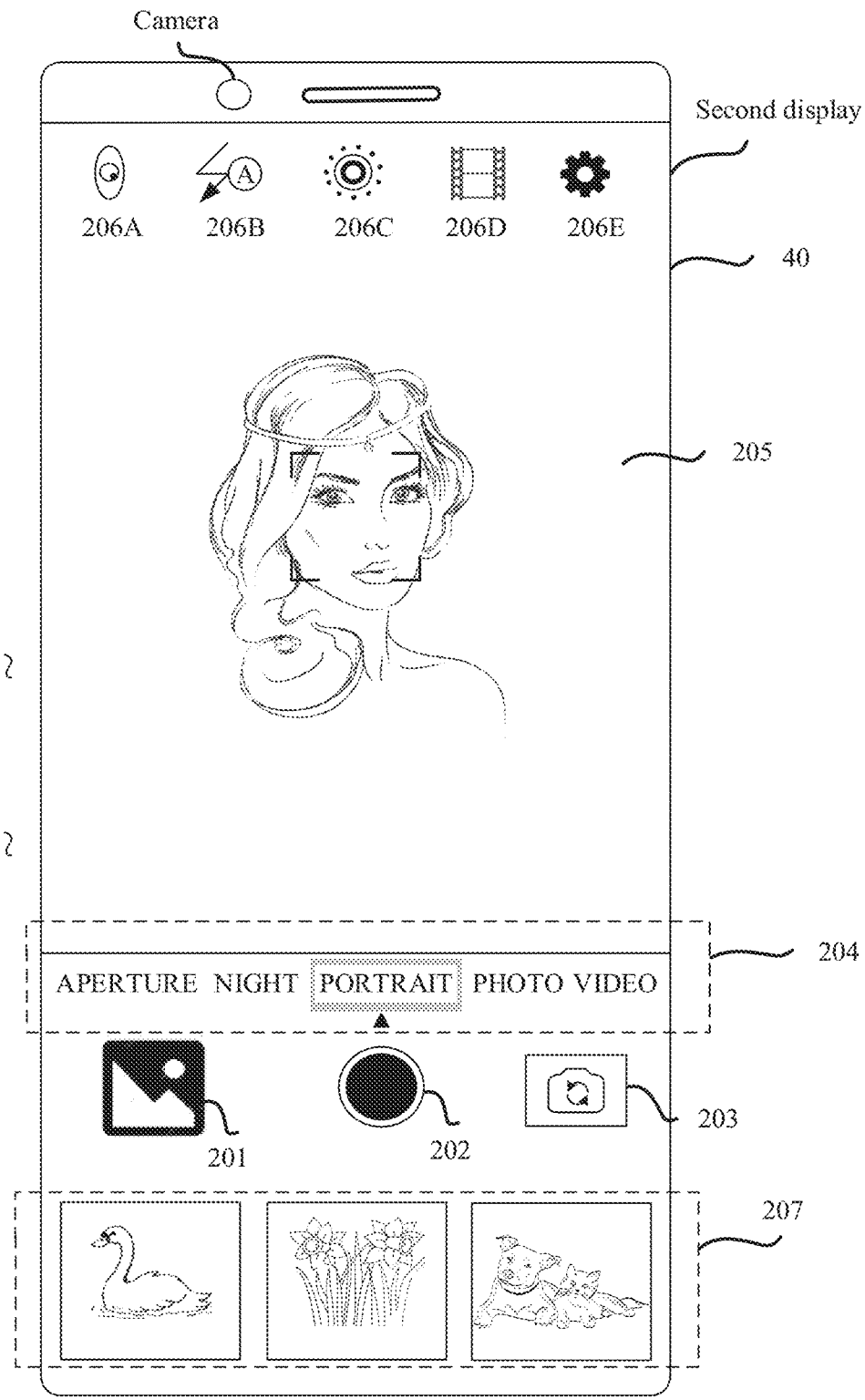

For example, FIG. 5b shows a selfie interface 40 that is displayed on the second display after the electronic device 100 detects the operation that the user flips over the electronic device when an aspect ratio of the second display is less than an aspect ratio of the first display. As shown in FIG. 5b, the selfie interface 40 may include a shot image redisplay control 201, a shooting control 202, a camera switching control 203, a shooting mode menu 204, a viewfinder 205, a shot image redisplay area 207, and some other controls such as a control 206A used to enable an object recognition function, a control 206B used to enable/disable a flash, a control 206C used to enable/disable a dynamic picture shooting function, a control 206D used to adjust a hue, and a setting control 206E. An image displayed in the viewfinder 205 is shot by the group of cameras disposed at the top of the second display, and may include a portrait of the user. The shot image redisplay area 207 is used to display an image shot by the electronic device 100 before. In some embodiments, the selfie interface 40 may further include a navigation bar that can be hidden. In this embodiment of this application, the user interface (for example, the selfie interface 40) that is displayed on the second display after the electronic device 100 is flipped over may be referred to as a second preview screen.

It can be learned by comparing FIG. 5a and FIG. 5b that when the aspect ratio of the second display is less than the aspect ratio of the first display, after the user flips over the electronic device, when the electronic device 100 displays the selfie interface on the second display, the arrangement manner of the elements in the selfie interface is adjusted. The adjustment includes reducing a spacing between the interface elements, adding the shot image redisplay area 207, and the like. The adjustment is not limited to adjusting the arrangement manner shown in FIG. 5b. During actual application, when displaying the selfie interface on the second display, the electronic device 100 may further adjust a display ratio of each element in the selfie interface, a display position of an interface element, adding or removing an interface element, and the like. This is not limited in this embodiment of this application.

In some embodiments, in response to the operation that the user flips over the electronic device, the electronic device 100 may further switch the shooting mode of the camera application to the portrait mode while displaying the selfie interface 40 on the second display. In the portrait mode, the portrait displayed by the viewfinder 205 in the selfie interface 40 is processed by the electronic device 100, and one or more of a depth of field effect, a background blur effect, and a beauty effect may be applied to the portrait. The depth of field effect applied to the portrait refers to blurring a background to highlight a shooting object (that is, a face). The background blur effect applied to the portrait refers to making a shallow depth of field, so that a focus of an image is focused on a face. The beauty effect may include but is not limited to Whiten, Thin face, Smooth, Enhance eyes, and the like.

For example, referring to FIG. 5b, when displaying the selfie interface 40 on the second display, the electronic device 100 switches the shooting mode of the camera application to the portrait mode.

In this embodiment of this application, when the electronic device 100 displays the selfie interface 40 on the second display in response to the operation that the user flips over the electronic device, the first display may display no content, for example, may enter a black screen state, or may still display the shooting interface 30. This is not limited herein. That the first display enters a black screen state may mean that the electronic device 100 stops power supply to the first display, or may mean that the first display displays a black screen. This is not limited herein. In some embodiments, when the first display still displays the shooting interface 30, the electronic device 100 may receive an entered user operation on the shooting interface 30 and make a response. In some other embodiments, when the first display still displays the shooting interface 30, the shooting interface 30 is locked. That is, the electronic device 100 can neither receive an entered user operation on the shooting interface 30 nor make a response. In this way, the user can be prevented from mistakenly triggering some functions of the electronic device 100 on the first display.

In some embodiments, after the electronic device 100 displays the selfie interface 40 on the second display in response to the operation that the user flips over the electronic device, the user may further flip over the electronic device 100 again, so that the electronic device 100 displays the shooting interface 30 on the first display. For example, referring to FIG. 5a, when detecting the operation that the user flips over the electronic device 100 again, the electronic device 100 may display the shooting interface 30 on the first display. When the electronic device displays the shooting interface 30 on the first display, the second display may display no content, for example, may enter a black screen state, or may still display the selfie interface 40. This is not limited herein.

It can be learned from the example in FIG. 5a and FIG. 5b that when the electronic device displays a shooting interface on the first display, the user may flip over the electronic device, to trigger the electronic device to display a selfie interface on the second display. In addition, the electronic device may further switch the shooting mode of the camera application to the portrait mode. This is easy to operate, and can meet a selfie requirement of the user, to improve user experience.

Application scenario 3: The electronic device 100 currently starts a video call application, and the first display displays a video call interface. The user may flip over the electronic device 100, to trigger the electronic device 100 to display a video call interface on the second display.

The video call application is an application that can provide a two-party or multi-party video call. For example, the video call application may include WeChat (WeChat), FaceTime, or Skype. In this embodiment of this application, the video call application may be referred to as a first application.

In the application scenario 3, a group of cameras are disposed at the top of each of the first display and the second display of the electronic device 100. In this embodiment of this application, the camera disposed at the top of the first display may be referred to as a first camera, and the camera disposed at the top of the second display may be referred to as a second camera.

Figure 6B:
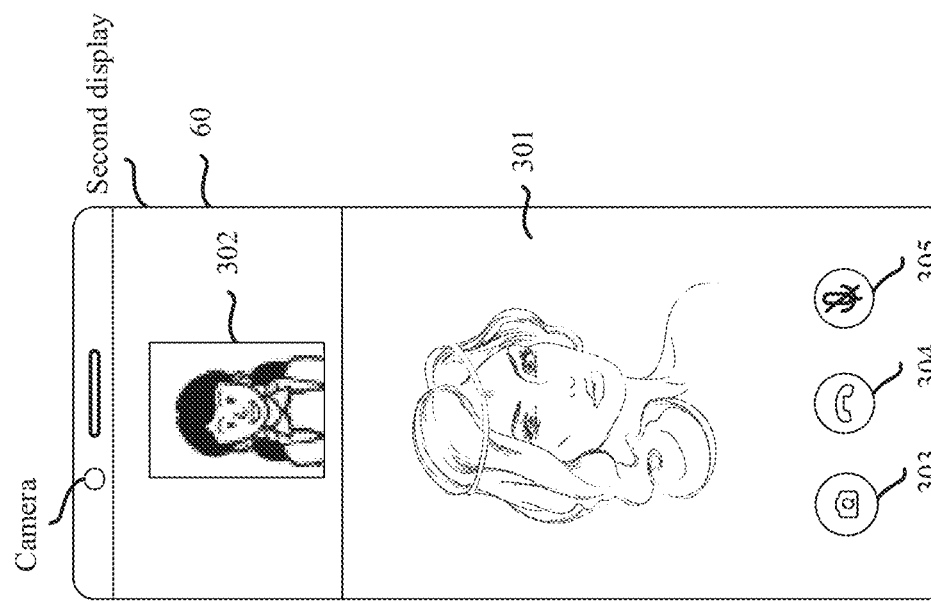
Figure 6A:
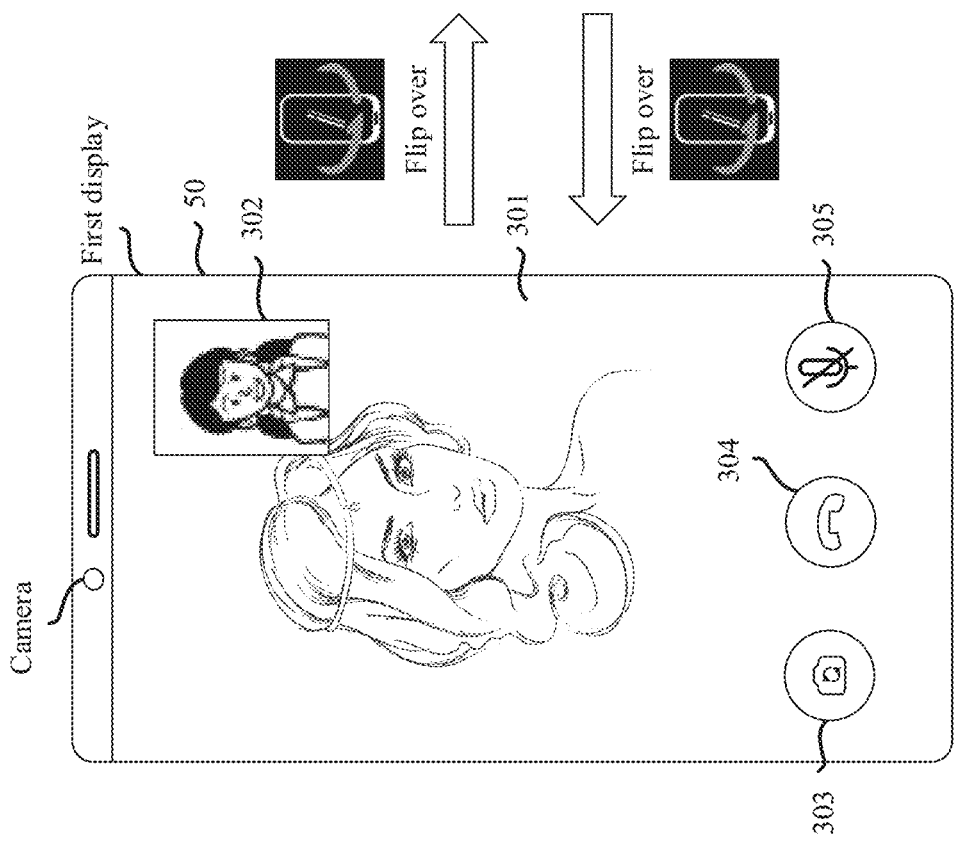

For example, FIG. 6a shows a video call interface 50 displayed on the first display when the electronic device 100 currently starts the video call application. In the example shown in FIG. 6a, the first display faces the user, and the back of the second display faces the user. For example, the video call interface 50 may include a shot image display area 301, a display area 302 of an image of the other party, a camera switching control 303, a hang-up control 304, a mute control 305, and the like. In some embodiments, the display area 302 of the image of the other party is displayed above the shot image display area 301 in a floating manner, and overlap the shot image display area 301. In some other embodiments, the area 302 and the area 301 shown in FIG. 6a may be interchanged. To be specific, the shot image display area 301 may be displayed above the display area 302 of the image of the other party in a floating manner, and overlap the display area 302 of the image of the other party. A user image displayed in the shot image display area 301 may be captured by the group of cameras disposed at the top of the first display. The display area 302 of the image of the other party is used to display an image of the other party in a video call, where the image of the other party in the video call is an image of the other party that sets up a video call connection with the user. In this embodiment of this application, the video call interface 50 displayed by the electronic device on the first display may be referred to as a first user interface of the first application.

In some embodiments, when the electronic device 100 is provided with a foldable display, the foldable display is in a folded state in the example shown in FIG. 6a. The folded state may change from an unfolded state. When the foldable display is in the unfolded state, the foldable display may display a user interface provided by the video call application, and the user interface is displayed on both the first display and the second display. In addition, the user interface is the enlarged user interface (for example, the video call interface 50) that is displayed on the first display when the foldable display is in the folded state. In some embodiments, when the foldable display is in the unfolded state, the foldable display may display the user interface provided by the video call application in full screen. In this embodiment of this application, the user interface that is displayed when the foldable display is in the unfolded state may be referred to as a third user interface of the first application.

In some embodiments, when the electronic device 100 displays the video call interface on the first display, the second display may be in a black screen state or may display content. That the second display is in a black screen state may mean that the electronic device 100 turns off power supply to the second display, or may mean that the second display displays a black screen. This is not limited herein.

In this embodiment of this application, the user may flip over the electronic device 100, to exchange locations of the second display and the first display of the electronic device 100 relative to the user. For example, the user may flip over the electronic device 100 in a direction of an arrow shown in FIG. 6a and FIG. 6b. After the user flips over the electronic device 100, the second display faces the user, and the back of the first display faces the user. Herein, for how the electronic device 100 detects the operation that the user flips over the electronic device, refer to related descriptions in the application scenario 1.

In the application scenario 3, after detecting the operation that the user flips over the electronic device 100, the electronic device 100 may disable the group of cameras disposed at the top of the first display, and enable the group of cameras disposed at the top of the second display. After the user flips over the electronic device 100, because the second display faces the user, the group of cameras disposed at the top of the second display are enabled and then shoot an image of the user. The electronic device 100 may display, on the second display, the image of the user shot by the group of cameras disposed at the top of the second display, and display a video call interface on the second display.

In this embodiment of this application, configurations of the first display and the second display may be the same or may be different. For example, screen sizes of the first display and the second display may be the same or may be different. When the screen sizes of the first display and the second display are the same, when the electronic device 100 displays a video call interface on the second display, interface elements in the video call interface may be arranged in a manner the same as interface elements in the video call interface displayed on the first display. When the screen sizes of the first display and the second display are different, when the electronic device 100 displays the video call interface on the second display, compared with the video call interface displayed on the first display, an arrangement manner of the interface elements in the video call interface may be adaptively adjusted, to better meet a user habit and be more beautiful in display.

For example, FIG. 6b shows a video call interface 60 that is displayed on the second display after the electronic device 100 detects the operation that the user flips over the electronic device when an aspect ratio of the second display is less than an aspect ratio of the first display. As shown in FIG. 6b, the video call interface 60 may include a shot image display area 301, a display area 302 of an image of the other party, a camera switching control 303, a hang-up control 304, a mute control 305, and the like. The display area 302 of the image of the other party does not overlap the shot image display area 301. A user image displayed in the shot image display area 301 is captured by the group of cameras disposed at the top of the second display. In this embodiment of this application, the user interface (for example, the video call interface 60) that is displayed on the second display after the electronic device 100 is flipped over may be referred to as a second user interface of the first application.

It can be learned by comparing FIG. 6a and FIG. 6b that when the aspect ratio of the second display is less than the aspect ratio of the first display, after the user flips over the electronic device, an arrangement manner of the elements in the video call interface is adjusted when the electronic device 100 displays the video call interface on the second display. The adjustment includes reducing an image in the shot image display area 301, reducing display ratios of the control 303, the control 304, and the control 305, adjusting locations of the display area 302 of the image of the other party and the shot image display area 301 relative to each other, and the like. The adjustment is not limited to adjusting the arrangement manner shown in FIG. 6*b*. During actual application, when displaying the video call interface on the second display, the electronic device 100 may further add or remove an interface element or the like. This is not limited in this embodiment of this application.

In some embodiments, when the electronic device 100 displays the video call interface on the second display in response to the operation that the user flips over the electronic device, the first display may display no content, for example, may enter a black screen state.

In some embodiments, after the electronic device 100 displays the video call interface 60 on the second display in response to the operation that the user flips over the electronic device, the user may further flip over the electronic device 100 again, so that the electronic device 100 displays the video call interface 50 on the first display. For example, referring to FIG. 6*a*, when detecting the operation that the user flips over the electronic device 100 again, the electronic device 100 may display the video call interface 50 on the first display.

It can be learned from the example in FIG. 6*a* and FIG. 6*b* that when the electronic device displays a video call interface on the first display, the user may flip over the electronic device, to trigger the electronic device to display a video call interface on the second display. When the video call interface is displayed on the second display, the video call interface is adapted to a size of the second display for display. This is easy to operate and can improve user experience.

Application scenario 4: The electronic device currently runs a ride-hailing application, and the user places an order by using the ride-hailing application. The user may flip over the electronic device 100, to trigger the electronic device 100 to display order information on the second display.

The user may release ride-hailing information by using the ride-hailing application, that is, place an order. A driver matching the ride-hailing information may receive the order and drive the user to a destination. The ride-hailing application may include but is not limited to DiDi, Uber (Uber), Lyft, or the like. In this embodiment of this application, the ride-hailing application may be referred to as a first application.

Figure 7A:
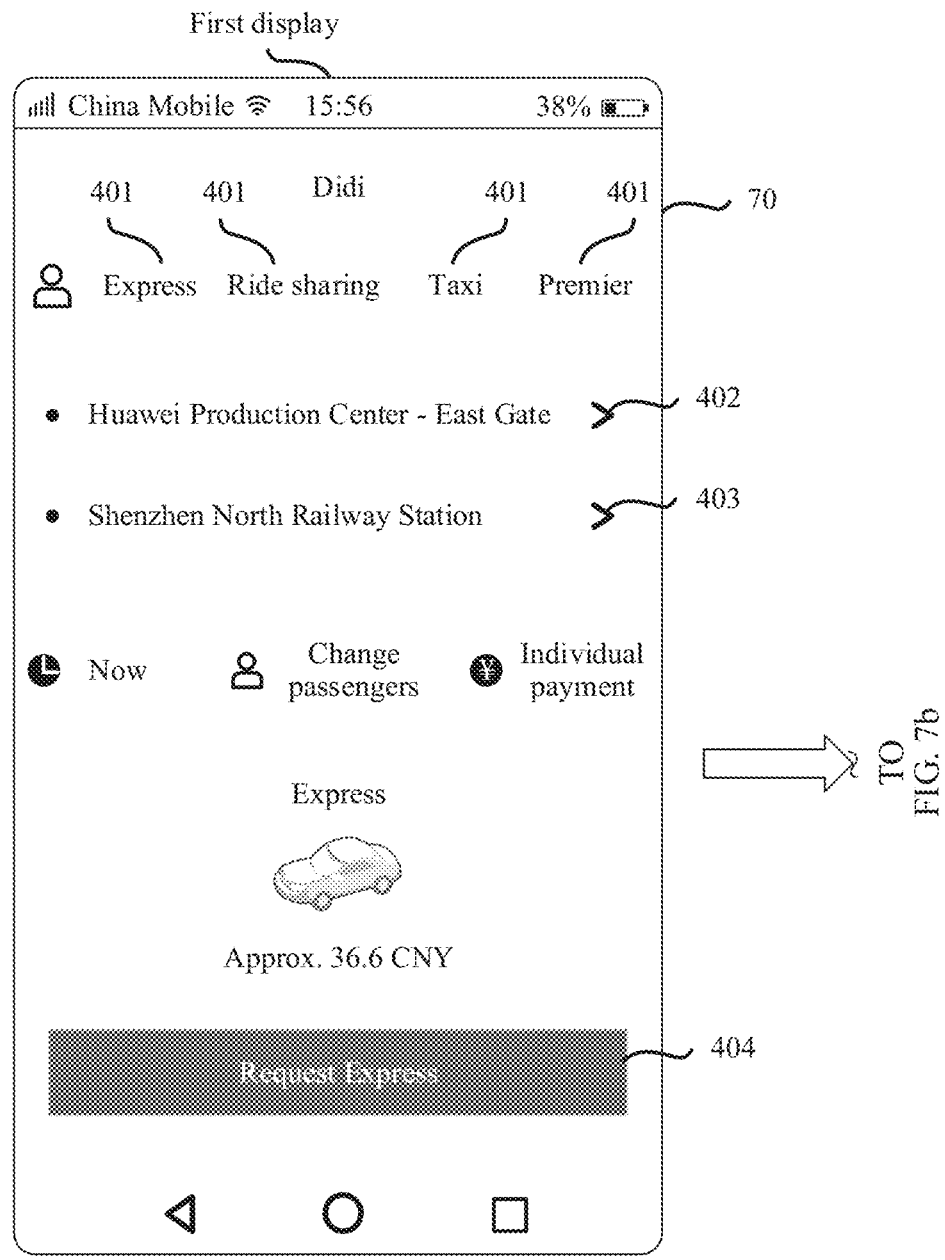

When the electronic device 100 currently runs the ride-hailing application, the user may place an order by using the ride-hailing application. For example, FIG. 7*a* shows a user interface 70 displayed on the first display when the user places an order by using the ride-hailing application. In the example shown in FIG. 7*a*, the first display faces the user, and the back of the second display faces the user. The user interface 70 may include a plurality of controls 401 for selecting a vehicle type, a pick-up point entering control 402, a drop-off point entering control 403, an express request control 404, and some other interface elements. In some embodiments, the user interface 70 may further include a status bar. In some embodiments, the user interface 70 may further include a navigation bar. After entering ride-hailing information in the user interface shown in FIG. 7*a*, the user may tap the express request control 404 to place an order. After the order is placed, the driver matching the ride-hailing information entered by the user can receive the order.

In some embodiments, when the electronic device 100 is provided with a foldable display, the foldable display is in a folded state in the example shown in FIG. 7*a*. The folded state may change from an unfolded state. When the foldable display is in the unfolded state, the foldable display may display a user interface provided by the ride-hailing application, and the user interface is displayed on both the first display and the second display. In addition, content displayed in the user interface includes content (for example, content included in the user interface 70) of the user interface that is displayed on the first display when the foldable display is in the folded state. In some embodiments, when the foldable display is in the folded state, the user interface provided by the ride-hailing application may be displayed in full screen. In some embodiments, the user interface that is displayed when the foldable display is in the unfolded state is the enlarged user interface that is displayed on the first display when the foldable display is in the folded state. In some other embodiments, the user interface that is displayed when the foldable display is in the unfolded state not only includes the content of the user interface that is displayed on the first display when the foldable display is in the folded state, but also may include other content, such as more text and controls. In this embodiment of this application, the user interface that is displayed when the foldable display is in the unfolded state may be referred to as a third user interface.

Figure 7B:
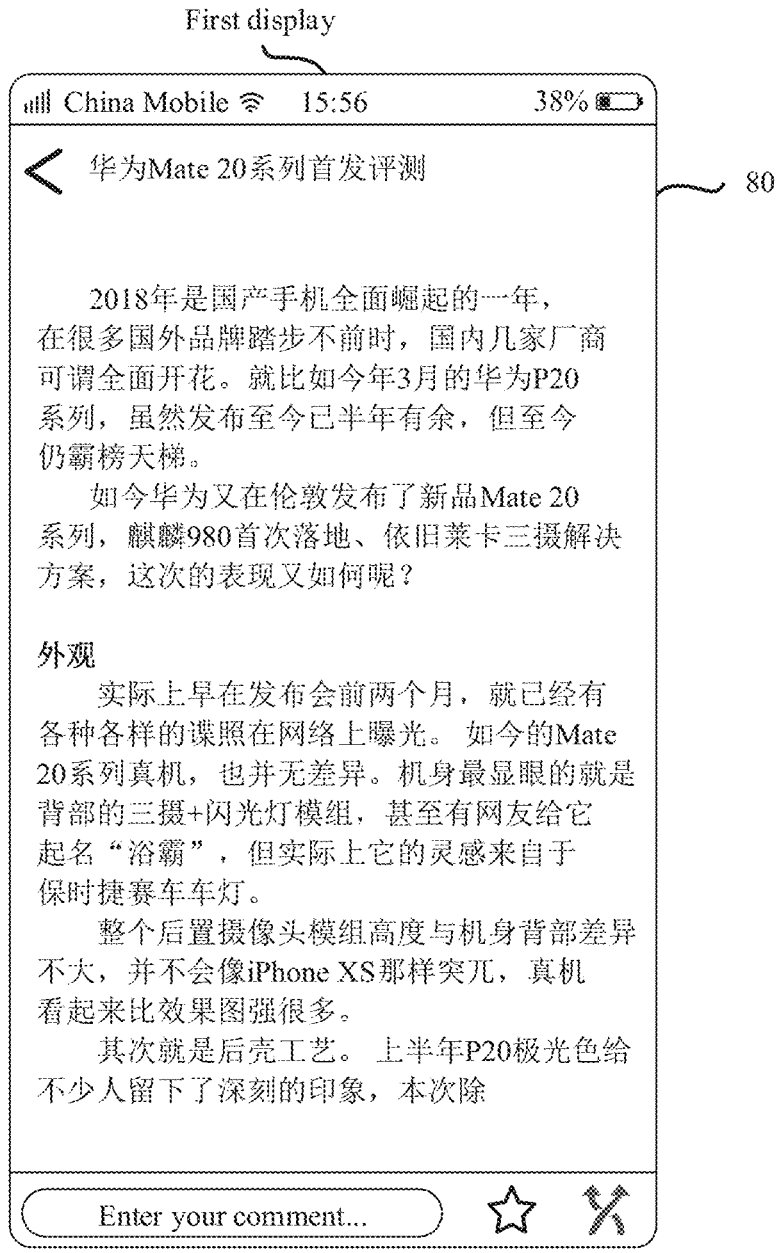

For example, referring to FIG. 7*b*, after the user places an order, the electronic device 100 may exit, in response to a user operation, from displaying the user interface provided by the ride-hailing application, and display a user interface 80 provided by another application (for example, a reading application). Herein, after the electronic device 100 exits from displaying the user interface provided by the ride-hailing application, the ride-hailing application still runs in the background of the electronic device 100. In this embodiment of this application, the user interface 80 displayed by the electronic device on the first display may be referred to as a first user interface.

In some embodiments, when the electronic device 100 displays the user interface shown in FIG. 7*b* on the first display, the second display may be in a black screen state or may display content. That the second display is in a black screen state may mean that the electronic device 100 turns off power supply to the second display, or may mean that the second display displays a black screen. This is not limited herein.

Figure 7C:
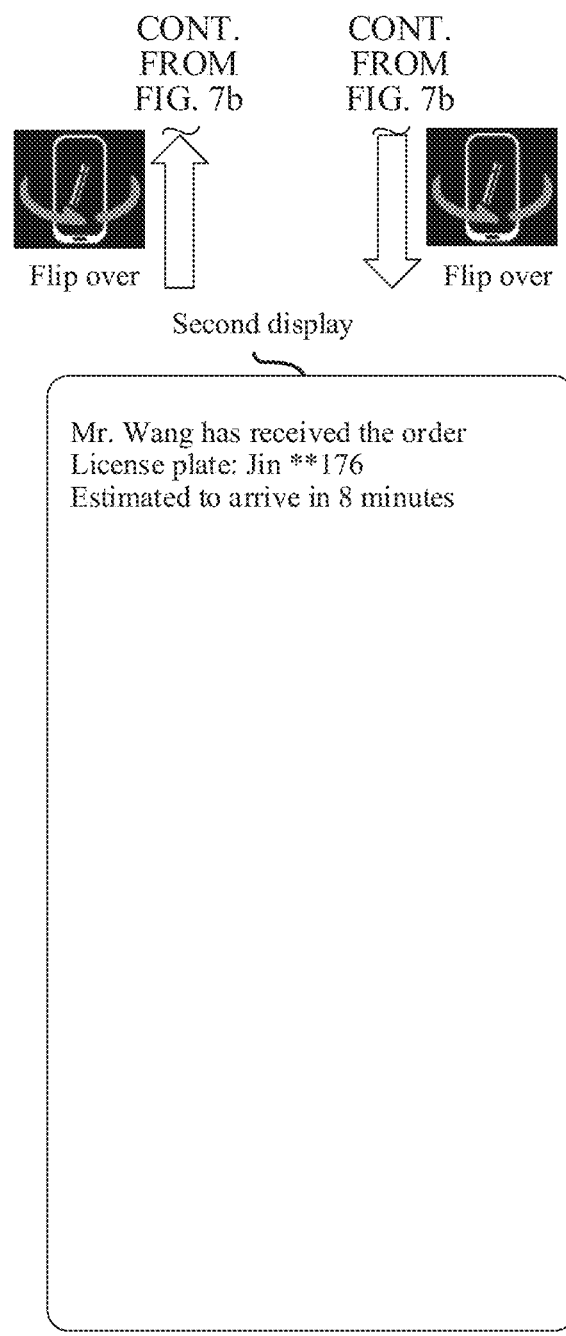

When the user interface 80 shown in FIG. 7*b* is displayed on the first display of the electronic device 100, the user may flip over the electronic device 100, and exchange locations of the second display of the electronic device 100 and the first display relative to the user. For example, the user may flip over the electronic device 100 in a direction of an arrow shown in FIG. 7*a* and FIG. 7*b*. In other words, after the user flips over the electronic device 100, the second display faces the user, and the back of the first display faces the user. In response to the operation that the user flips over the electronic device, the electronic device 100 may display, on the second display, order information of an order placed by the user by using the ride-hailing application. The order information may include at least one of the following: whether the order is received, an order recipient, contact information of the order recipient, a license plate of the order recipient, a time when the order recipient arrives at a pickup point, and the like. For example, FIG. 7*c* shows order information that is displayed on the second display after the electronic device 100 detects the operation that the user flips over the electronic device. In this embodiment of this application, the user interface (for example, a user interface shown in FIG. 7c) that is displayed on the second display after the electronic device 100 is flipped over may be referred to as a second user interface.

In this embodiment of this application, when the electronic device 100 displays the order information on the second display in response to the operation that the user flips over the electronic device, the first display may display no content, for example, may enter a black screen state, or may still display the user interface 80. This is not limited herein. That the first display enters a black screen state may mean that the electronic device 100 stops power supply to the first display, or may mean that the first display displays a black screen. This is not limited herein. In some embodiments, when the first display still displays the user interface 80, the electronic device 100 may receive an entered user operation on the user interface 80 and make a response. In some other embodiments, when the first display still displays the user interface 80, the user interface 80 is locked. That is, the electronic device 100 can neither receive an entered user operation on the user interface 80 nor make a response. In this way, the user can be prevented from mistakenly triggering some functions of the electronic device 100 on the first display.

In some embodiments, after the electronic device 100 displays the order information on the second display in response to the operation that the user flips over the electronic device, the user may further flip over the electronic device 100 again, so that the electronic device 100 displays the user interface 80 on the first display. For example, referring to FIG. 7b, when detecting an operation that the user flips over the electronic device 100 again, the electronic device 100 may display the user interface 80 on the first display. When the electronic device 100 displays the user interface 80 on the first display, the second display may display no content, for example, may enter a black screen state, or may still display the order information. This is not limited herein.

It can be learned from the example in FIG. 7a to FIG. 7c that after the user places an order on the first display by using the ride-hailing application and views a user interface provided by another application, the user may flip over the electronic device, to trigger the electronic device to display order information on the second display, so that the user can conveniently view an order progress. This improves user experience.

Application scenario 5: The electronic device 100 receives a new message, and displays notification information of the new message on the first display. The user may flip over the electronic device 100, to trigger the electronic device 100 to display specific content of the new message on the second display.

In the application scenario 5, the electronic device 100 may run, in the background, an application that can receive a new message, for example, a Messages application, an instant chat application, and a ticket booking application (for example, Booking, Qunar, and Ctrip). The electronic device may receive a new message by using the application. The new message may include but is not limited to an SMS message, an instant chat message (for example, a WeChat message or a Skype message), an application notification message (for example, a push message of an application), or the like.

When receiving a new message, the electronic device 100 displays notification information of the new message on a display. The notification information is usually a prompt window provided by a notification manager in the electronic device 100. For example, FIG. 8a shows a user interface 90 displayed on the first display when the electronic device 100 receives a new message. The user interface 90 includes a prompt window 501. In the example shown in FIG. 8a, the first display faces the user, and the back of the second display faces the user.

As shown in FIG. 8a, the new message is a flight prompt message, and may be pushed by a ticket booking application to the electronic device 100. The prompt window 501 floats above other content displayed by the electronic device 100. The prompt window 501 includes a general of the new message, and is used to prompt the user that the new message is received. Generally, if the user wants to view specific content of the new message, the user may tap the prompt window 501, and the electronic device 100 may display the specific content of the new message on the first display in response to the operation that the user taps the prompt window 501. That is, generally, the user needs to view the specific content of the new message by performing a tap operation. In this embodiment of this application, the application used to receive the new message may be referred to as a first application, and the user interface 90 displayed by the electronic device on the first display may be referred to as a first user interface.

In some embodiments, when the electronic device 100 is provided with a foldable display, the foldable display is in a folded state in the example shown in FIG. 8a. The folded state may change from an unfolded state. When the foldable display is in the unfolded state, the foldable display may display a user interface, and the user interface is displayed on both the first display and the second display. In addition, content displayed in the user interface includes content (for example, content included in the user interface 90) of the user interface that is displayed on the first display when the foldable display is in the folded state. In some embodiments, when the foldable display is in the folded state, the user interface may be displayed in full screen. In some embodiments, the user interface that is displayed when the foldable display is in the unfolded state is the enlarged user interface that is displayed on the first display when the foldable display is in the folded state. In some other embodiments, the user interface that is displayed when the foldable display is in the unfolded state not only includes the content of the user interface that is displayed on the first display when the foldable display is in the folded state, but also may include other content, such as more text and controls. In this embodiment of this application, the user interface that is displayed when the foldable display is in the unfolded state may be referred to as a third user interface.

In some embodiments, when the electronic device 100 displays the notification information of the new message on the first display, the second display may be in a black screen state or may display content. That the second display is in a black screen state may mean that the electronic device 100 turns off power supply to the second display, or may mean that the second display displays a black screen. This is not limited herein.

In this embodiment of this application, the user may flip over the electronic device 100, to exchange locations of the second display and the first display of the electronic device 100 relative to the user. For example, the user may flip over the electronic device 100 in a direction of an arrow shown in FIG. 8a and FIG. 8b. In other words, after the user flips over the electronic device 100, the second display faces the user, and the back of the first display faces the user. The electronic device 100 may display the specific content of the new message on the second display in response to the operation that the user flips over the electronic device. Specifically, when the electronic device 100 displays the notification information of the new message on the first display and detects the operation that the user flips over the electronic device, the electronic device 100 may invoke an application to which the new message pushed, obtain the specific content of the new message, and display the specific content of the new message on the second display. Herein, for how the electronic device 100 detects the operation that the user flips over the electronic device, refer to related descriptions in the application scenario 1.

For example, FIG. 8b shows the specific content of the new message that is displayed on the second display after the electronic device 100 detects the operation that the user flips over the electronic device. The specific content of the new message may include an airline company, a flight number, a departure place, a destination, a departure time, a landing time, and the like. It can be learned from FIG. 8a and FIG. 8b that the user may flip over the electronic device, to view the specific content of the new message on the second display. In this embodiment of this application, a user interface (for example, a user interface shown in FIG. 8b) that is displayed on the second display after the electronic device 100 is flipped over may be referred to as a second user interface.

In this embodiment of this application, when the electronic device 100 displays the specific content of the new message on the second display in response to the operation that the user flips over the electronic device, the first display may display no content, for example, may enter a black screen state, or may still display the user interface 90. This is not limited herein. In some embodiments, when the first display still displays the user interface 90, the notification information of the new message is no longer displayed in the user interface 90, that is, the notification information of the new message in the first display is cleared. When the first display still displays the user interface 90, the electronic device 100 may receive an entered user operation on the user interface 90 and make a response. Alternatively, the user interface 90 is locked, that is, the electronic device 100 can neither receive an entered user operation on the user interface 90 nor make a response. In this way, the user can be prevented from mistakenly triggering some functions of the electronic device 100 on the first display.

In some embodiments, after the electronic device 100 displays the specific content of the new message on the second display in response to the operation that the user flips over the electronic device, the user may further flip over the electronic device 100 again, so that the electronic device 100 displays the user interface 90 on the first display. For example, referring to FIG. 8a, when detecting the operation that the user flips over the electronic device 100 again, the electronic device 100 may display the user interface 90 on the first display. When the electronic device displays the user interface 90 on the first display, the second display may display no content, for example, may enter a black screen state, or may still display the specific content of the new message. This is not limited herein.

It can be learned from the example in FIG. 8a and FIG. 8b that when the electronic device displays the notification information of the new message on the first display, the user may flip over the electronic device, to trigger the electronic device to display the specific content of the new message on the second display. The user can view the specific content of the new message through a simple user operation, and get good user experience.

The application scenario is not limited to the five application scenarios described above. In the embodiments of this application, the electronic device may further display corresponding content on the second display with reference to another started application. For example, the electronic device may further run a navigation application. After the user selects a navigation route on the first display by using the navigation application, and the electronic device displays a user interface provided by another application, the user may flip over the electronic device, to trigger the electronic device to display, on the second display, a navigation interface provided by the navigation application. For another example, the electronic device may further run a Messages application. When the electronic device receives a new SMS message and displays notification information of the new SMS message on the first display, the user may flip over the electronic device, to trigger the electronic device to display specific content of the new SMS message on the second display. The specific content of the new SMS message may include a sender, a sending time, content of the SMS message, and the like.

(2) The user flips over the electronic device, to trigger the electronic device to display corresponding content on the second display with reference to the current location.

In the case (2), the current location of the electronic device may be a subway station, a station, a shopping mall, an express delivery point, or the like. The following describes the display method provided in the embodiments of this application with reference to a specific application scenario.

Application scenario 6: When the user is in a subway station, the user views content by using the first display of the electronic device 100. The user may flip over the electronic device 100, to trigger the electronic device 100 to display a subway ride code on the second display.

Herein, the subway ride code may be a two-dimensional code. The user can swipe the subway ride code on a card machine of a subway station for payment, to enter or exit the subway station.

Figures 9A, 9B:
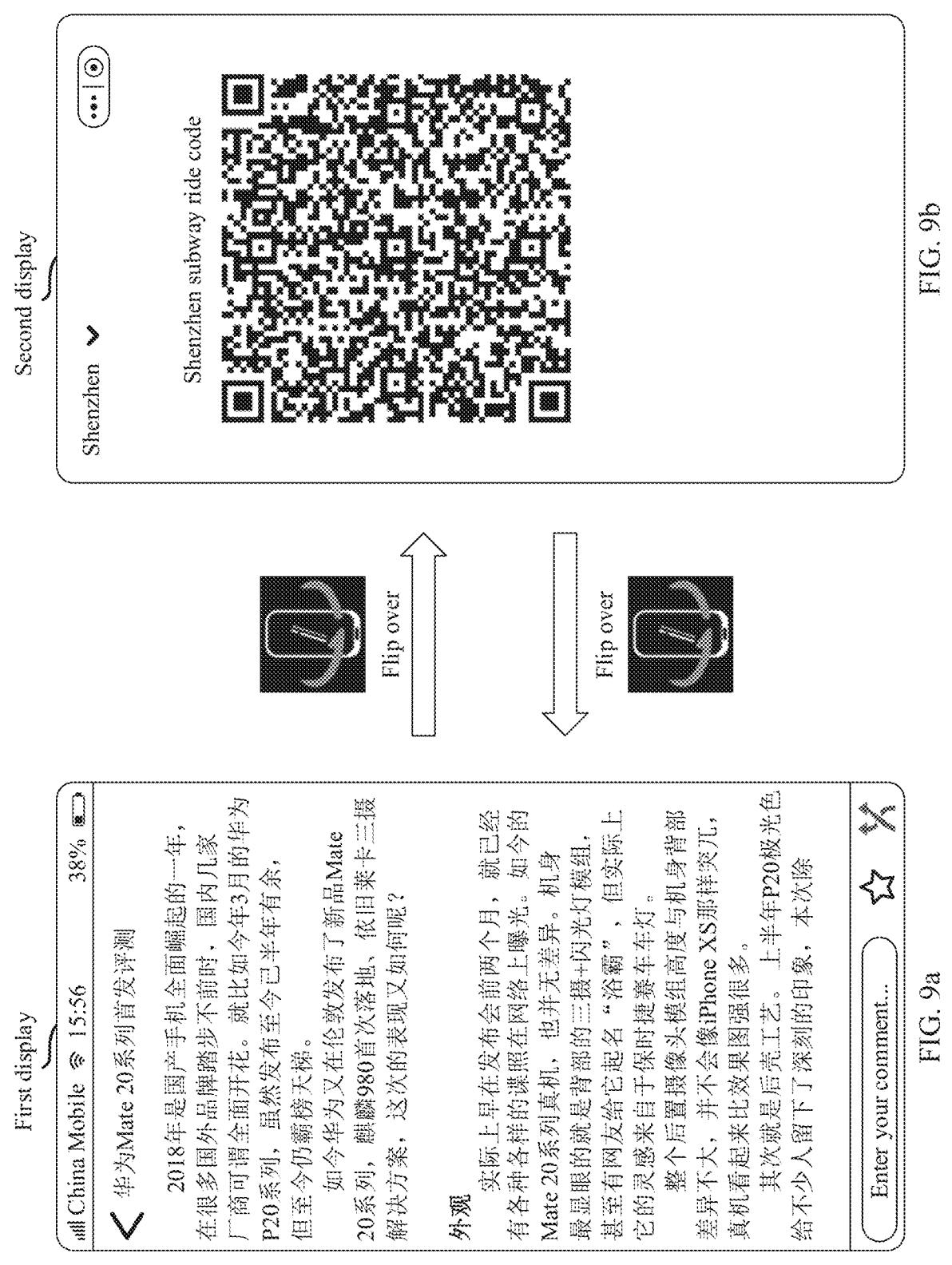

In the application scenario 6, when the user is in a subway station, the user may view content by using the first display, and the content may be provided by any application. For example, the content on the first display may be a reading interface, a video interface, an album interface, or a game interface. For example, FIG. 9a shows a user interface displayed on the first display when the user is in a subway station. In the example shown in FIG. 9a, the first display faces the user, and the back of the second display faces the user. In this embodiment of this application, a user interface (for example, the user interface shown in FIG. 9a) displayed by the electronic device on the first display may be referred to as a first user interface.

In some embodiments, when the electronic device 100 is provided with a foldable display, the foldable display is in a folded state in the example shown in FIG. 9a. The folded state may change from an unfolded state. When the foldable display is in the unfolded state, the foldable display may display a user interface, and the user interface is displayed on both the first display and the second display. In addition, content displayed in the user interface includes content (for example, content included in the user interface shown in FIG. 9a) of the user interface that is displayed on the first display when the foldable display is in the folded state. In some embodiments, when the foldable display is in the folded state, the user interface may be displayed in full screen. In some embodiments, the user interface that is displayed when the foldable display is in the unfolded state is the enlarged user interface that is displayed on the first display when the foldable display is in the folded state. In some other embodiments, the user interface that is displayed when the foldable display is in the unfolded state not only includes the content of the user interface that is displayed on the first display when the foldable display is in the folded state, but also may include other content, such as more text and controls. In this embodiment of this application, the user interface that is displayed when the foldable display is in the unfolded state may be referred to as a third user interface.

In some embodiments, when the electronic device 100 displays the interface shown in FIG. 9a on the first display, the second display may be in a black screen state or may display content. That the second display is in a black screen state may mean that the electronic device 100 turns off power supply to the second display, or may mean that the second display displays a black screen. This is not limited herein.

In this embodiment of this application, the user may flip over the electronic device 100, to exchange locations of the second display and the first display of the electronic device 100 relative to the user. For example, the user may flip over the electronic device 100 in a direction of an arrow shown in FIG. 9a and FIG. 9b. In other words, after the user flips over the electronic device 100, the second display faces the user, and the back of the first display faces the user. When the user is in a subway station, the electronic device 100 may display a subway ride code on the second display in response to the operation that the user flips over the electronic device.

During specific implementation, the electronic device 100 may obtain current location information in the following several manners: 1. The current location information is obtained by using navigation systems such as the GPS, the GLONASS, and the BDS. 2. The current location information is obtained through a network. For example, the current location information is obtained through base station positioning, Wi-Fi positioning, a location based service (location based service, LBS), or a geo-fence technology. After obtaining the current location information, the electronic device 100 may determine whether the electronic device 100 is located in a subway station.

For example, FIG. 9b shows the subway ride code that is displayed on the second display after the electronic device 100 detects the operation that the user flips over the electronic device when the user is in a subway station. Herein, the subway ride code displayed on the second display may be obtained in the following manner: The electronic device 100 invokes a ride function provided by some applications, for example, a WeChat mini program, to obtain the subway ride code. In this embodiment of this application, a user interface (for example, a user interface shown in FIG. 9b) that is displayed on the second display after the electronic device 100 is flipped over may be referred to as a second user interface.

In some embodiments, to prevent a misoperation, the electronic device 100 may further display a subway ride code on the second display with reference to a time in which the user is in a subway station. For example, if the time in which the user is in a subway station is a predetermined time period (for example, 7:00 to 9:00 and 17:00 to 22:00 on a working day that correspond to a time period spent traveling to work and a time period spent traveling from work respectively), when the user flips over the electronic device, the electronic device 100 displays the subway ride code on the second display. Displaying the subway ride code on the second display with reference to the time in which the user is in a subway station can avoid that the user mistakenly triggers the second display to display the subway ride code when the user is in a subway station but does not want to take subway. For example, the user passes a subway station at 12:00 noon but does not want to take subway.

This application is not limited to the ride code shown in FIG. 9b. In this embodiment of this application, the electronic device may further provide a payment function for the user in another manner during a ride. For example, the electronic device may communicate with another device through NFC, and the user may add an NFC bus card to a wallet application in the electronic device 100 in advance. When the user is in a subway station, the user may flip over the electronic device, to trigger the electronic device to start the wallet application, invoke the NFC bus card, and display an NFC bus card swiping interface on the second display, so that the electronic device can complete payment by using the NFC bus card, and the user can take subway successfully.

In this embodiment of this application, when the electronic device 100 displays the subway ride code or the NFC bus card swiping interface on the second display in response to the operation that the user flips over the electronic device, the first display may display no content, for example, may enter a black screen state, or may still display the original user interface. This is not limited herein. That the first display enters a black screen state may mean that the electronic device 100 stops power supply to the first display, or may mean that the first display displays a black screen. This is not limited herein. In some embodiments, when the first display still displays the user interface shown in FIG. 9a, the electronic device 100 may receive an entered user operation on the user interface and make a response. In some other embodiments, when the first display still displays the user interface shown in FIG. 9a, the user interface is locked. That is, the electronic device 100 can neither receive an entered user operation on the user interface nor make a response. In this way, the user can be prevented from mistakenly triggering some functions of the electronic device 100 on the first display.

In some embodiments, after the electronic device 100 displays the subway ride code or the NFC bus card swiping interface on the second display in response to the operation that the user flips over the electronic device, the user may further flip over the electronic device 100 again, so that the electronic device 100 displays the original content on the first display. For example, referring to FIG. 9a, when detecting the operation that the user flips over the electronic device 100 again, the electronic device 100 may display the user interface shown in FIG. 9a on the first display. When the electronic device displays the user interface shown in FIG. 9a on the first display, the second display may display no content, for example, may enter a black screen state, or may still display the subway ride code or the NFC bus card swiping interface. This is not limited herein.

It can be learned from the example in FIG. 9a and FIG. 9b that when the user is in a subway station, the user may flip over the electronic device 100, to trigger the electronic device 100 to display the subway ride code or the NFC bus card swiping interface on the second display. The user may complete payment by using the subway ride code or the NFC bus card swiping interface, to take subway successfully. In other words, the user may trigger, through a simple user operation, the electronic device to display the subway ride code or the NFC bus card swiping interface, so that the user takes subway conveniently, and gets good user experience.

Application scenario 7: When the user is in a shopping mall, the user views content by using the first display of the electronic device 100. The user may flip over the electronic device 100, to trigger the electronic device 100 to display a payment code on the second display.

Figure 10A:
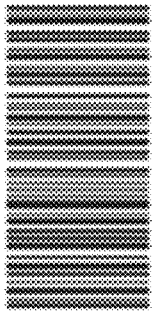

In the application scenario 7, when the user is in a shopping mall, the user may view content by using the first display, and the content may be provided by any application. For example, the content on the first display may be a reading interface, a video interface, an album interface, or a game interface. For example, FIG. 10a shows a user interface displayed on the first display when the user is in a shopping mall. In the example shown in FIG. 10a, the first display faces the user, and the back of the second display faces the user. In this embodiment of this application, a user interface (for example, the user interface shown in FIG. 10a) displayed by the electronic device on the first display may be referred to as a first user interface.

In some embodiments, when the electronic device 100 is provided with a foldable display, the foldable display is in a folded state in the example shown in FIG. 10a. The folded state may change from an unfolded state. When the foldable display is in the unfolded state, the foldable display may display a user interface, and the user interface is displayed on both the first display and the second display. In addition, content displayed in the user interface includes content (for example, content included in the user interface shown in FIG. 10a) of the user interface that is displayed on the first display when the foldable display is in the folded state. In some embodiments, when the foldable display is in the folded state, the user interface may be displayed in full screen. In some embodiments, the user interface that is displayed when the foldable display is in the unfolded state is the enlarged user interface that is displayed on the first display when the foldable display is in the folded state. In some other embodiments, the user interface that is displayed when the foldable display is in the unfolded state not only includes the content of the user interface that is displayed on the first display when the foldable display is in the folded state, but also may include other content, such as more text and controls. In this embodiment of this application, the user interface that is displayed when the foldable display is in the unfolded state may be referred to as a third user interface.

In some embodiments, when the electronic device 100 displays the user interface shown in FIG. 10a on the first display, the second display may be in a black screen state or may display content. That the second display is in a black screen state may mean that the electronic device 100 turns off power supply to the second display, or may mean that the second display displays a black screen. This is not limited herein.

In this embodiment of this application, the user may flip over the electronic device 100, to exchange locations of the second display and the first display of the electronic device 100 relative to the user. For example, the user may flip over the electronic device 100 in a direction of an arrow shown in FIG. 10a and FIG. 10b. In other words, after the user flips over the electronic device 100, the second display faces the user, and the back of the first display faces the user. When the user is in a shopping mall, the electronic device 100 may display a payment code on the second display in response to the operation that the user flips over the electronic device. Herein, a manner in which the electronic device 100 obtains current location information is the same as that in the application scenario 6. For details, refer to related descriptions. After obtaining the current location information, the electronic device 100 may determine whether the electronic device 100 is located in a shopping mall.

Figure 10B:
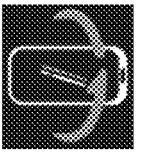

For example, FIG. 10b shows the payment code that is displayed on the second display after the electronic device 100 detects the operation that the user flips over the electronic device when the user is in a shopping mall. As shown in 10b, the payment code may be a barcode and a two-dimensional code. Herein, the payment code displayed on the second display may be provided by a payment application (for example, WeChat or Alipay) installed on the electronic device 100. In this embodiment of this application, a user interface (for example, a user interface shown in FIG. 10b) that is displayed on the second display after the electronic device 100 is flipped over may be referred to as a second user interface.

This application is not limited to the payment code shown in FIG. 10b. In this embodiment of this application, the electronic device may further provide a payment function for the user in another manner during shopping. For example, the electronic device may communicate with another device through NFC, and the user may add an NFC bank card to a wallet application in the electronic device 100 in advance. When the user is in a shopping mall, the user may flip over the electronic device, to trigger the electronic device to start the wallet application, invoke the NFC bank card, and display an NFC bank card swiping interface on the second display, so that the electronic device can complete payment by using the NFC bank card, and the user can do the shopping successfully.

In this embodiment of this application, when the electronic device 100 displays the payment code or the NFC bank card swiping interface on the second display in response to the operation that the user flips over the electronic device, the first display may display no content, for example, may enter a black screen state, or may still display the original content. This is not limited herein. That the first display enters a black screen state may mean that the electronic device 100 stops power supply to the first display, or may mean that the first display displays a black screen. This is not limited herein. In some embodiments, when the first display still displays the user interface shown in FIG. 10a, the electronic device 100 may receive an entered user operation on the user interface and make a response. In some other embodiments, when the first display still displays the user interface shown in FIG. 10a, the user interface is locked. That is, the electronic device 100 can neither receive an entered user operation on the user interface nor make a response. In this way, the user can be prevented from mistakenly triggering some functions of the electronic device 100 on the first display.

In some embodiments, after the electronic device 100 displays the payment code or the NFC bank card swiping interface on the second display in response to the operation that the user flips over the electronic device, the user may further flip over the electronic device 100 again, so that the electronic device 100 displays the original content on the first display. For example, referring to FIG. 10a, when detecting the operation that the user flips over the electronic device 100 again, the electronic device 100 may display the user interface shown in FIG. 10a on the first display, for example, the electronic device 100 enters a black screen state. When the electronic device displays the user interface shown in FIG. 10a on the first display, the second display may display no content, or may still display the payment code or the NFC bank card swiping interface. This is not limited herein.

It can be learned from the example in FIG. 10a and FIG. 10b that when the user is in a shopping mall, the user may flip over the electronic device 100, to trigger the electronic device 100 to display the payment code or the NFC bank card swiping interface on the second display. The user may complete payment by using the payment code or the NFC bank card swiping interface, to do the shopping successfully. In other words, the user may trigger, through a simple user operation, the electronic device to display the payment code or the NFC bank card swiping interface, to do the shopping successfully, and get good user experience.

In the application scenario 7, when the user is in a shopping mall, the user may flip over the electronic device, to trigger the electronic device to display the payment code or the NFC bank card swiping interface on the second display. In some other embodiments, when the user is in a shopping mall, the user may further flip over the electronic device, to trigger the electronic device to display a promo code/coupon, an electronic movie ticket, a movie ticket pickup code, and the like on the second display. This facilitates consumption of the user in a shopping mall. The electronic movie ticket and the movie ticket pickup code may be provided by a ticketing application (for example, Maoyan, Taopiaopiao, or Meituan).

Application scenario 8: When the user is near a parcel locker, the user views content by using the first display of the electronic device 100. The user may flip over the electronic device 100, to trigger the electronic device 100 to display a parcel pickup code on the second display.

The parcel locker is a self-service device that is set up in public places and can be used for delivery and pickup of parcels. A recipient can ask an express company to deliver a parcel to a specified parcel locker, and then use a pickup code sent from the parcel locker to an electronic device (for example, a mobile phone) to pick up the parcel. Herein, the pickup code may be a numeric password.

In the application scenario 8, when the user is near a parcel locker, the user may view content by using the first display, and the content may be provided by any application. For example, the content on the first display may be a reading interface, a video interface, an album interface, or a game interface. For example, FIG. 11a shows a user interface displayed on the first display when the user is near a parcel locker. In the example shown in FIG. 11a, the first display faces the user, and the back of the second display faces the user. In this embodiment of this application, a user interface (for example, the user interface shown in FIG. 11a) displayed by the electronic device on the first display may be referred to as a first user interface.

In some embodiments, when the electronic device 100 is provided with a foldable display, the foldable display is in a folded state in the example shown in FIG. 11a. The folded state may change from an unfolded state. When the foldable display is in the unfolded state, the foldable display may display a user interface, and the user interface is displayed on both the first display and the second display. In addition, content displayed in the user interface includes content (for example, content included in the user interface shown in FIG. 11a) of the user interface that is displayed on the first display when the foldable display is in the folded state. In some embodiments, when the foldable display is in the folded state, the user interface may be displayed in full screen. In some embodiments, the user interface that is displayed when the foldable display is in the unfolded state is the enlarged user interface that is displayed on the first display when the foldable display is in the folded state. In some other embodiments, the user interface that is displayed when the foldable display is in the unfolded state not only includes the content of the user interface that is displayed on the first display when the foldable display is in the folded state, but also may include other content, such as more text and controls. In this embodiment of this application, the user interface that is displayed when the foldable display is in the unfolded state may be referred to as a third user interface.

In some embodiments, when the electronic device 100 displays the user interface shown in FIG. 11a on the first display, the second display may be in a black screen state or may display content. That the second display is in a black screen state may mean that the electronic device 100 turns off power supply to the second display, or may mean that the second display displays a black screen. This is not limited herein.

In this embodiment of this application, the user may flip over the electronic device 100, to exchange locations of the second display and the first display of the electronic device 100 relative to the user. For example, the user may flip over the electronic device 100 in a direction of an arrow shown in FIG. 11a and FIG. 11b. In other words, after the user flips over the electronic device 100, the second display faces the user, and the back of the first display faces the user. When the user is near a parcel locker, the electronic device 100 may display a parcel pickup code on the second display in response to the operation that the user flips over the electronic device. Herein, the electronic device 100 may determine, in the following manners, whether the electronic device 100 is currently near a parcel locker: 1. The electronic device 100 obtains current location information, and determines, based on the current location information, whether the electronic device 100 is currently near a parcel locker. When a distance between a current location and a parcel locker is less than a preset value (for example, 10 meters or 20 meters), the electronic device 100 may determine that the electronic device 100 is currently near the parcel locker. Herein, a manner in which the electronic device 100 obtains the current location information is the same as that in the application scenario 6. For details, refer to related descriptions. 2. A parcel locker may continuously broadcast a message in a near field communication manner such as Wi-Fi, Bluetooth, or NFC. When receiving a message sent by a parcel locker, the electronic device 100 may determine that the electronic device 100 is currently near the parcel locker.

For example, FIG. 11b shows the pickup code that is displayed on the second display after the electronic device 100 detects the operation that the user flips over the electronic device when the user is near a parcel locker. In some embodiments, the second display may further display one or more of the following: an express company, an express order number, an image of an article, a name of the article, an address of a parcel locker to which the article is delivered, a company to which the parcel locker belongs, and the like. In this embodiment of this application, a user interface (for example, a user interface shown in FIG. 11b) that is displayed on the second display after the electronic device 100 is flipped over may be referred to as a second user interface.

Herein, the pickup code and other information displayed on the second display may be obtained in the following several manners: 1. The electronic device obtains the pickup code and the other information from a database of an express company. For example, the electronic device may send an express order number to a server of an express company, and the server searches a stored database for information corresponding to the express order number, and sends the information corresponding to the express order number to the electronic device. Herein, the information corresponding to the express order number includes the pickup code. 2. The electronic device reads an SMS message of the user, and obtains the pickup code and the other information from the SMS message of the user. Specifically, after delivering a parcel to a parcel locker, an express company may send an SMS message to the electronic device by using a server, where the SMS message carries the pickup code. 3. The electronic device obtains the pickup code and the other information from a third-party application (for example, Taobao or Jingdong). Specifically, the user usually purchases a commodity in the third-party application. After the commodity is delivered to an express company for transportation, the third-party application obtains a transportation status fed back by the express company. The transportation status includes the pickup code.

In some embodiments, the user is near a parcel locker, but no parcel of the user is stored in the parcel locker. In other words, a parcel of the user is stored in another parcel locker. Therefore, to prevent the second display from being mistakenly triggered to display the pickup code, the electronic device 100 may further display the pickup code on the second display with reference to an address of a parcel locker to which the commodity is delivered. Specifically, when the electronic device 100 is near a parcel locker, the electronic device 100 may compare a location of the parcel locker with the address of the parcel locker to which the user's article is delivered, to determine whether the parcel locker is the parcel locker to which the article is delivered. If the parcel locker is the parcel locker to which the article is delivered, the electronic device 100 displays the pickup code on the second display. The address of the parcel locker to which the user's article is delivered may be obtained in any one of the foregoing three manners.

After the electronic device 100 displays the pickup code on the second display in response to the operation that the user flips over the electronic device, the user may pick up the parcel by using the pickup code. For example, the user may enter the pickup code into the parcel locker, and the parcel locker opens a corresponding parcel locker based on the received pickup code, and the user may pick up the parcel from the parcel locker. In some embodiments, the second display may further display a pickup control no. The user may tap the pickup control 110. After detecting the tap operation entered by the user, the electronic device 100 may send, to the parcel locker through Bluetooth, Wi-Fi, NFC, a cellular data network, or the like, a verification identifier (for example, a pickup code) of a parcel corresponding to the pickup control. The parcel locker may automatically open a corresponding parcel locker based on the verification identifier, so that the user picks up the parcel.

In this embodiment of this application, when the electronic device 100 displays the pickup code on the second display in response to the operation that the user flips over the electronic device, the first display may display no content, for example, may enter a black screen state, or may still display the original content. This is not limited herein. That the first display enters a black screen state may mean that the electronic device 100 stops power supply to the first display, or may mean that the first display displays a black screen. This is not limited herein. In some embodiments, when the first display still displays the user interface shown in FIG. 11a, the electronic device 100 may receive an entered user operation on the user interface and make a response. In some other embodiments, when the first display still displays the user interface shown in FIG. 11a, the user interface is locked. That is, the electronic device 100 can neither receive an entered user operation on the user interface nor make a response. In this way, the user can be prevented from mistakenly triggering some functions of the electronic device 100 on the first display.

In some embodiments, after the electronic device 100 displays the pickup code on the second display in response to the operation that the user flips over the electronic device, the user may further flip over the electronic device 100 again, so that the electronic device 100 displays the original user interface on the first display. For example, referring to FIG. 11a, when detecting the operation that the user flips over the electronic device 100 again, the electronic device 100 may display the user interface shown in FIG. 11a on the first display. When the electronic device displays the user interface shown in FIG. 11a on the first display, the second display may display no content, for example, may enter a black screen state, or may still display the pickup code. This is not limited herein.

It can be learned from the example in FIG. 11a and FIG. 11b that when the user is near a parcel locker, the user may flip over the electronic device 100, to trigger the electronic device 100 to display the pickup code on the second display. The user may pick up a parcel by using the pickup code. In other words, the user may trigger, through a simple user operation, the electronic device to display the pickup code, to successfully pick up a parcel, and get good user experience.

With reference to the foregoing application scenarios 1 to 8, in some embodiments, to ensure data security of the electronic device, the electronic device may prompt the user to verify an identity before displaying corresponding content on the second display. After the verification succeeds, the electronic device displays the corresponding content on the second display. Herein, the user may verify the identity by using one or more of the following: a password, a fingerprint, a face, a voiceprint, a gesture, or the like. For example, in the application scenario 7, after detecting the operation that the user flips over the electronic device, the electronic device may prompt, on the second display, the user to verify the identity. The user may enter verification information to the electronic device, and the electronic device displays the payment code on the second display only after the verification succeeds, that is, only when the verification information entered by the user is consistent with prestored verification information.

Figure 12B:
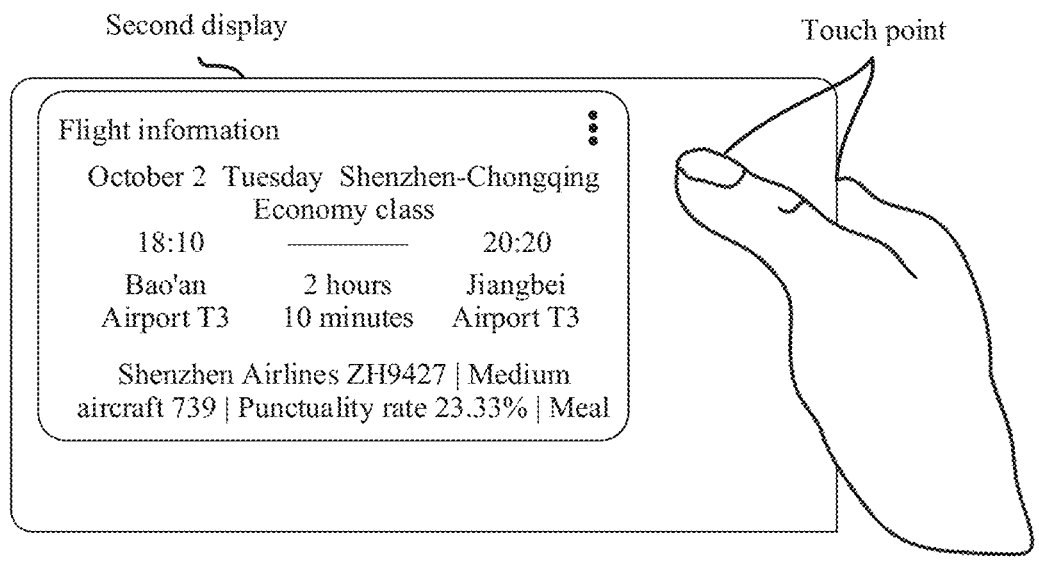

With reference to the foregoing application scenarios 1 to 8, in some embodiments, when the user flips over the electronic device to trigger the electronic device to display corresponding content on the second display, an area in which the content is located may be related to a manner in which the user holds the electronic device. Specifically, after the user flips over the electronic device, the content on the second display is displayed in an area that is not blocked by a hand of the user, so that the user can view the content conveniently. For example, FIG. 12a shows a user interface displayed on the first display when the electronic device 100 receives a new message. After the electronic device detects the operation that the user flips over the electronic device, for example, referring to FIG. 12b, after the user flips over the electronic device, the user holds the electronic device in a landscape mode, and the electronic device 100 may display specific content of the new message in a left area that is on the second display and that is not blocked by the hand of the user.

During specific implementation, the electronic device 100 may detect the manner of holding the electronic device by the user, to determine the area that is on the second display and that is not blocked by the user. Specifically, a pressure sensor may be disposed below the second display of the electronic device 100. When the user holds the electronic device, pressure acts on the pressure sensor at a corresponding position. Therefore, the electronic device may calculate, based on pressure measured by the pressure sensor, a position of a touch point at which the user touches the second display, to determine an area that is on the second display and that is blocked by the hand of the user. In some embodiments, a pressure sensor may also be disposed at a frame of the electronic device 100. The electronic device 100 may further calculate a position of a touch point of the user at the frame based on pressure measured by the pressure sensor, to assist in determining an area that is on the second display and that is blocked by the hand of the user. For example, referring to FIG. 12b, after the user flips over the electronic device, the user holds the electronic device in a manner shown in FIG. 12b. The electronic device 100 may detect, by using the pressure sensor disposed below the second display and/or at the frame, pressure generated when the user holds the electronic device, and determine positions of touch points shown in FIG. 12b. The electronic device may determine, based on the positions of the touch points shown in FIG. 12b, that a right area of the second display is currently blocked by the hand of the user.

Figure 13A:
Figure 13B:
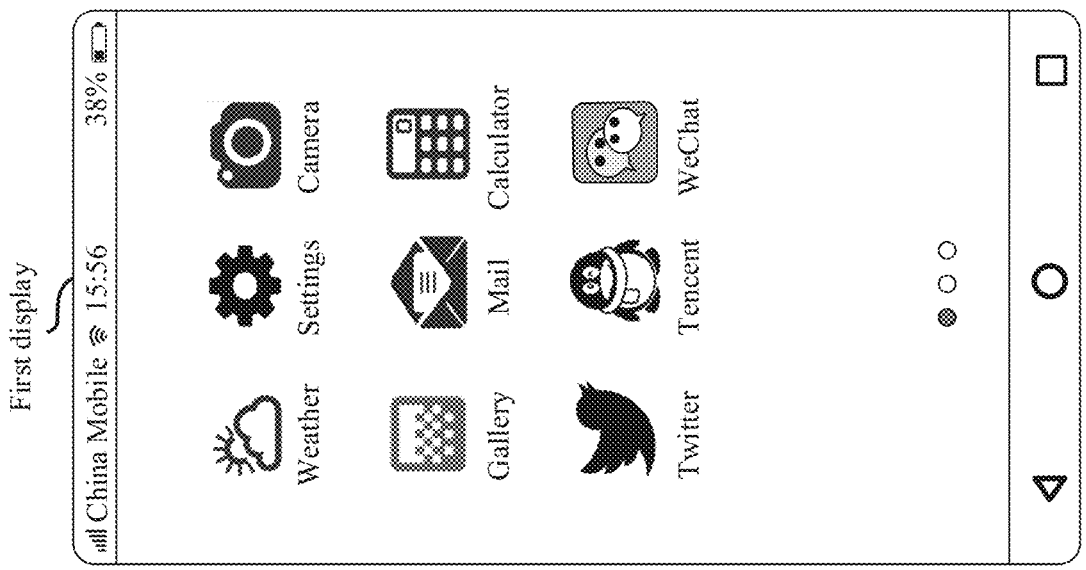

In this embodiment of this application, in addition to displaying corresponding content on the second display of the electronic device with reference to a specific scenario, the second display may further display preset content in response to the operation that the user flips over the electronic device. The preset content may be set by the electronic device or the user. This is not limited herein. For example, the electronic device or the user may set the content to a time and weather widget, a calendar, a schedule, or the like. For example, FIG. 13a shows a user interface displayed on the first display. The user interface includes icons of applications installed on the electronic device, a status bar, and a navigation bar. In the example shown in FIG. 13a, the first display faces the user, and the back of the second display faces the user. For example, referring to FIG. 13b, the electronic device 100 displays a preset time and weather widget on the second display in response to the operation that the user flips over the electronic device.

Figure 14A:
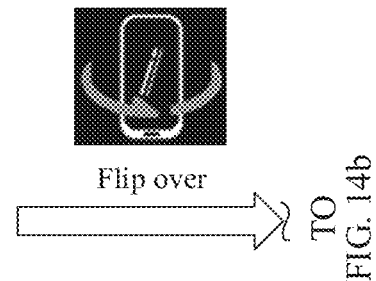
Figure 14B:

It may be understood that in the embodiments of this application, the foregoing embodiments may be implemented in combination. For example, one or more of the application scenarios 4 to 8 may appear at the same time. For example, it is assumed that the application scenario 5 and the application scenario 6 appear at the same time. That is, the user receives a new message when being in a subway station, and the electronic device or the user presets displaying the time and weather widget on the second display. For example, FIG. 14a shows a user interface displayed on the first display. In the example shown in FIG. 14a, the first display faces the user, and the back of the second display faces the user. For example, referring to FIG. 14b, the user may flip over the electronic device, to trigger the electronic device to simultaneously display specific content of the new message, a subway ride code, and the preset time and weather widget on the second display.

In some embodiments of this application, the electronic device may alternatively display preset content on a display with reference to a current posture. The following provides description with reference to an application scenario.

Application scenario 9: When the user lifts the electronic device to a vertical posture, the electronic device displays preset content on a display whose back faces the user. The preset content may include one or more of the following: an identifier of a brand of the electronic device, a personalized pattern or a personalized signature set by the user, and the like.

Figure 15:
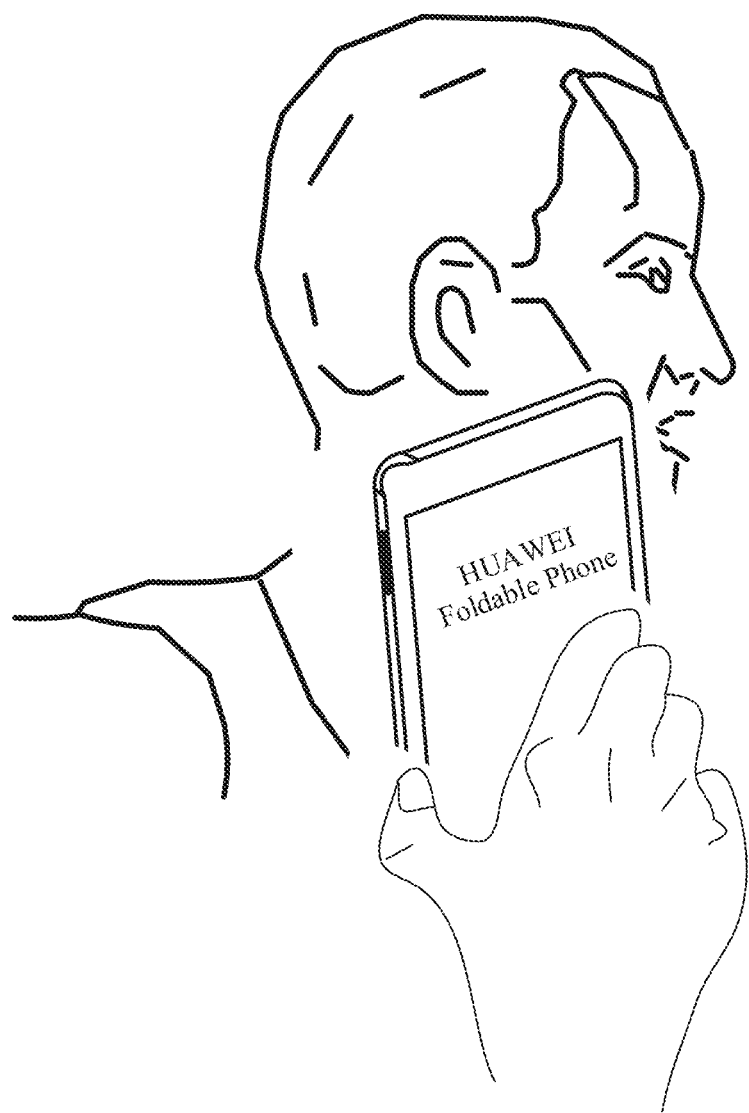

Specifically, that the electronic device is in a vertical posture means that an included angle between a Y axis and a vertical direction of the electronic device is within a preset angle (for example, 30 degrees). The vertical direction is the direction of gravity or the opposite direction of gravity. The electronic device may detect, by using one or more of a gyro sensor, an acceleration sensor, or a gravity sensor, whether the electronic device 100 is in the vertical posture. For example, FIG. 15 shows content that is displayed on a display whose back faces the user when the user makes a call or answers a call, that is, when the electronic device is in the vertical posture.

The embodiments in FIG. 4a to FIG. 15 describe human-computer interaction scenarios in the embodiments of this application. The following describes a display method provided in the embodiments of this application.

Figure 16:
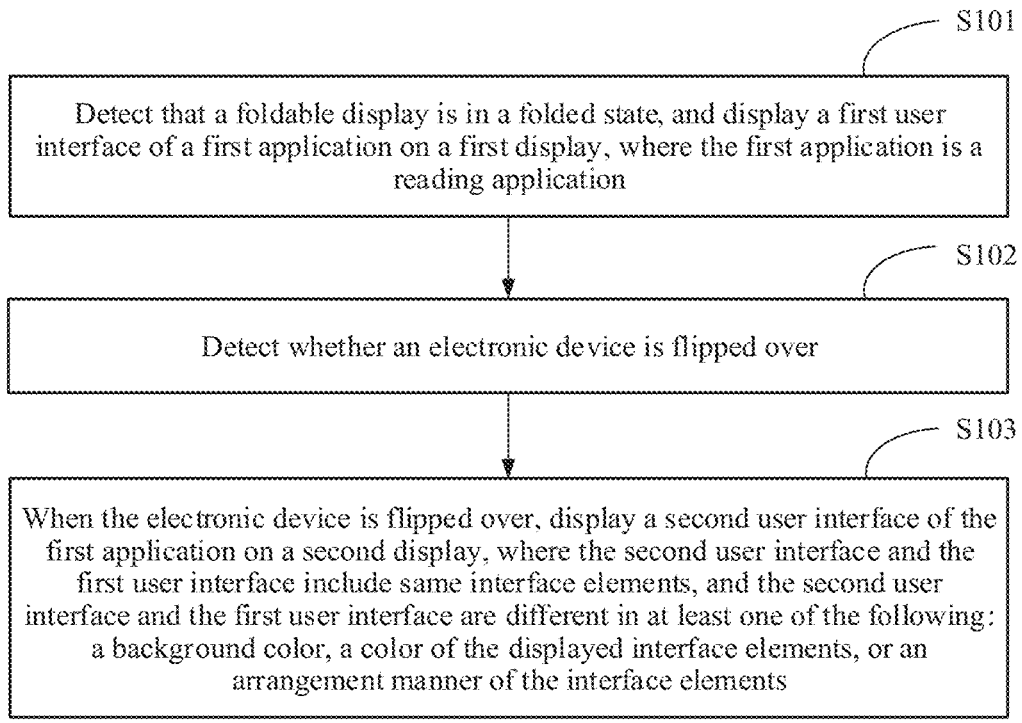
FIG. 16 to FIG. 21 are schematic flowcharts of a display method according to this application.

FIG. 16 is a schematic flowchart of a display method according to an embodiment of this application. The display method shown in FIG. 16 corresponds to the application scenario 1. The display method is applied to an electronic device provided with a foldable display, and the foldable display includes a first display and a second display. For definitions of the first display and the second display, refer to the foregoing related descriptions.

As shown in the figure, the display method may include the following steps.

Step S101: Detect that the foldable display is in a folded state, and display a first user interface of a first application on the first display, where the first application is a reading application.

Specifically, the electronic device may detect a folding angle by using an angle sensor disposed on the foldable display, and determine, based on the folding angle, whether the foldable display is in the folded state or an unfolded state. For a method for determining, by the electronic device based on the folding angle, whether the foldable display is in the folded state or the unfolded state, refer to related descriptions of the foldable display in the embodiment in FIG. 2.

For an example of the first application, refer to related descriptions in the embodiment in FIG. 4a and FIG. 4b. For an example of the first user interface, refer to FIG. 4a.

In some embodiments, before detecting that the foldable display is in the folded state, the electronic device may detect that the foldable display is in the unfolded state, and display a third user interface of the first application, where the third user interface is displayed on both the first display and the second display, and content displayed in the third user interface includes content displayed in the first user interface. Further, in some embodiments, the electronic device may display the third user interface of the first application on the foldable display in full screen. Herein, for a definition of the third user interface, refer to related descriptions in the embodiment in FIG. 4a and FIG. 4b. In other words, the folded state of the foldable display may change from the unfolded state.

In some embodiments, the electronic device may stop power supply to the second display or may display content on the second display when displaying the first user interface of the first application on the first display. This is not limited herein.

Step S102: Detect whether the electronic device is flipped over.

Specifically, for a meaning of flipping over the electronic device, refer to related descriptions in the embodiment in FIG. 4a and FIG. 4b. For a method for detecting whether the electronic device is flipped over, refer to related descriptions in the embodiment in FIG. 4a and FIG. 4b.

Step S103: When the electronic device is flipped over, display a second user interface of the first application on the second display, where the second user interface and the first user interface include same interface elements, and the second user interface and the first user interface are different in at least one of the following: a background color, a color of the displayed interface elements, or an arrangement manner of the interface elements.

Specifically, for an example of the second user interface, refer to FIG. 4b.

In some embodiments, when displaying the second user interface of the first application on the second display, the electronic device may stop power supply to the first display, or may display the original user interface on the first display, that is, display the first user interface.

In some embodiments, the electronic device may further determine an area that is on the second display and that is not blocked by a hand of a user, and when the electronic device is flipped over, display the second user interface in the area that is on the second display and that is not blocked by the hand of the user. Herein, for a method for determining, by the electronic device, the area that is on the second display and that is not blocked by the hand of the user, and a manner of displaying the second user interface in the area that is on the second display and that is not blocked by the hand of the user, refer to related descriptions in the embodiment in FIG. 12a and FIG. 12b.

In some embodiments, before the electronic device is flipped over, the first display faces the user, and the back of the second display faces the user. After the electronic device is flipped over, the second display faces the user, and the back of the first display faces the user.

Figure 17:
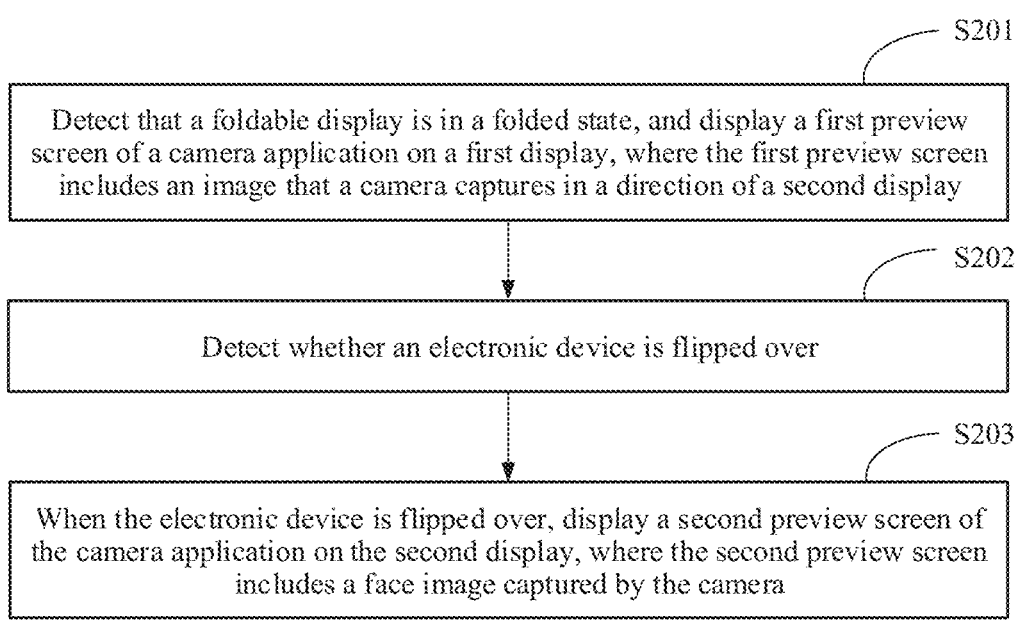

FIG. 17 is a schematic flowchart of a display method according to an embodiment of this application. The display method shown in FIG. 17 corresponds to the application scenario 2. The display method is applied to an electronic device provided with a foldable display, the foldable display includes a first display and a second display, and a camera is disposed at the top of the first display. For definitions of the first display and the second display, refer to the foregoing related descriptions.

As shown in the figure, the display method may include the following steps.

Step S201: Detect that the foldable display is in a folded state, and display a first preview screen of a camera application on the first display, where the first preview screen includes an image that the camera captures in a direction of the second display.

Specifically, a method for detecting, by the electronic device, whether the foldable display is in the folded state or an unfolded state is the same as that in step S101 in FIG. 16. For details, refer to related descriptions.

For an example of the first preview screen, refer to FIG. 5a.

In some embodiments, before detecting that the foldable display is in the folded state, the electronic device may detect that the foldable display is in the unfolded state, and display a third preview screen of the camera application. The third preview screen is displayed on both the first display and the second display, and the third preview screen includes the image that the camera captures in the direction of the second display. Further, in some embodiments, the electronic device may display the third preview screen of the camera application on the foldable display in full screen. Herein, for a definition of the third preview screen, refer to related descriptions in the embodiment in FIG. 5a and FIG. 5b. In other words, the folded state of the foldable display may change from the unfolded state.

In some embodiments, the electronic device may stop power supply to the second display or may display content on the second display when displaying the first preview screen of the camera application on the first display. This is not limited herein.

Step S202: Detect whether the electronic device is flipped over.

Specifically, for a meaning of flipping over the electronic device, refer to related descriptions in the embodiment in FIG. 5a and FIG. 5b. For a method for detecting whether the electronic device is flipped over, refer to related descriptions in the embodiment in FIG. 5a and FIG. 5b.

Step S203: When the electronic device is flipped over, display a second preview screen of the camera application on the second display, where the second preview screen includes a face image captured by the camera.

Specifically, for an example of the second preview screen, refer to FIG. 5b.

In some embodiments, the face image displayed in the second preview screen has at least one of the following effects: a depth of field effect, a background blur effect, or a beauty effect.

In some embodiments, when displaying the second preview screen of the camera application on the second display, the electronic device may stop power supply to the first display, or may display the original user interface on the first display, that is, display the first user interface.

In some embodiments, the electronic device may further determine an area that is on the second display and that is not blocked by a hand of a user, and when the electronic device is flipped over, display the second preview screen of the camera application in the area that is on the second display and that is not blocked by the hand of the user. Herein, for a method for determining, by the electronic device, the area that is on the second display and that is not blocked by the hand of the user, and a manner of displaying the second preview screen of the camera application in the area that is on the second display and that is not blocked by the hand of the user, refer to related descriptions in the embodiment in FIG. 12a and FIG. 12b.

In some embodiments, before the electronic device is flipped over, the first display faces the user, and the back of the second display faces the user. After the electronic device is flipped over, the second display faces the user, and the back of the first display faces the user.

Figure 18:
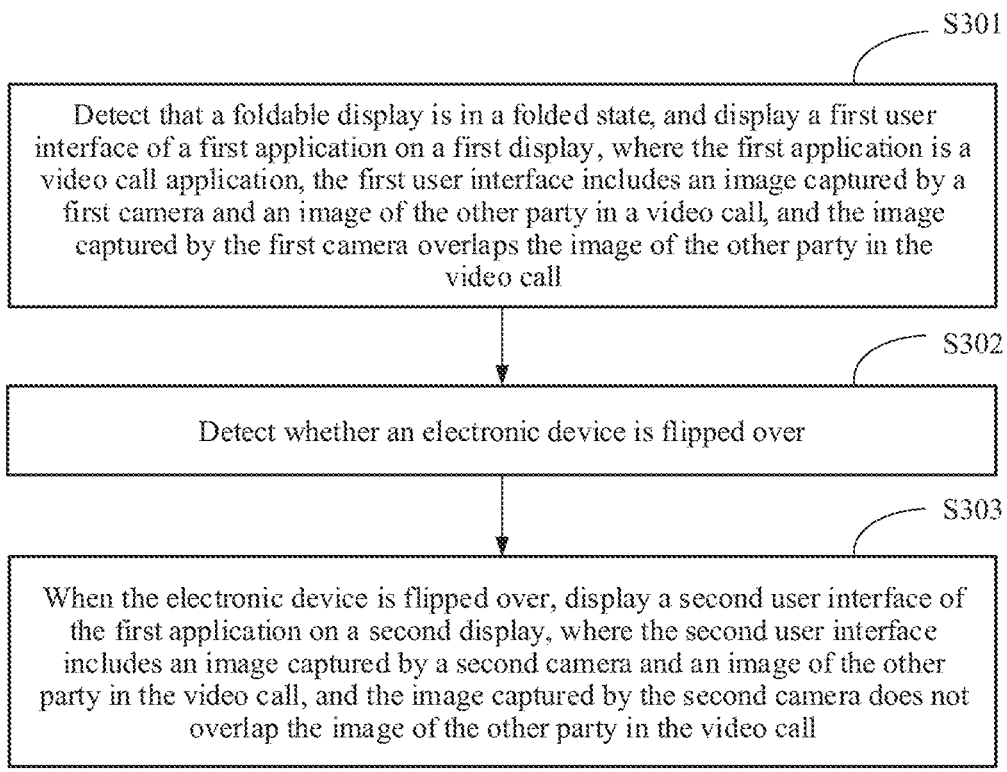

FIG. 18 is a schematic flowchart of a display method according to an embodiment of this application. The display method shown in FIG. 18 corresponds to the application scenario 3. The display method is applied to an electronic device provided with a foldable display, the foldable display includes a first display and a second display, a first camera is disposed at the top of the first display, and a second camera is disposed at the top of the second display. For definitions of the first display and the second display, refer to the foregoing related descriptions.

As shown in the figure, the display method may include the following steps.

Step S301: Detect that the foldable display is in a folded state, and display a first user interface of a first application on the first display, where the first application is a video call application, the first user interface includes an image captured by the first camera and an image of the other party in a video call, and the image captured by the first camera overlaps the image of the other party in the video call.

Specifically, a method for detecting, by the electronic device, whether the foldable display is in the folded state or an unfolded state is the same as that in step S101 in FIG. 16. For details, refer to related descriptions.

For an example of the first application, refer to related descriptions in the embodiment in FIG. 6a and FIG. 6b. For an example of the first user interface, refer to FIG. 6a.

In some embodiments, before detecting that the foldable display is in the folded state, the electronic device may detect that the foldable display is in the unfolded state, and display a third user interface of the first application, where the third user interface is displayed on both the first display and the second display, and the third user interface is the enlarged first user interface. Further, in some embodiments, the electronic device may display the third user interface of the first application on the foldable display in full screen. Herein, for a definition of the third user interface, refer to related descriptions in the embodiment in FIG. 6a and FIG. 6b. In other words, the folded state of the foldable display may change from the unfolded state.

In some embodiments, the electronic device may stop power supply to the second display or may display content on the second display when displaying the first user interface of the first application on the first display. This is not limited herein.

Step S302: Detect whether the electronic device is flipped over.

Specifically, for a meaning of flipping over the electronic device, refer to related descriptions in the embodiment in FIG. 6a and FIG. 6b. For a method for detecting whether the electronic device is flipped over, refer to related descriptions in the embodiment in FIG. 6a and FIG. 6b.

Step S303: When the electronic device is flipped over, display a second user interface of the first application on the second display, where the second user interface includes an image captured by the second camera and an image of the other party in the video call, and the image captured by the second camera does not overlap the image of the other party in the video call.

Specifically, for an example of the second user interface, refer to FIG. 6b.

In some embodiments, when displaying the second user interface of the first application on the second display, the electronic device may stop power supply to the first display, or may display the original user interface on the first display, that is, display the first user interface.

In some embodiments, the electronic device may further determine an area that is on the second display and that is not blocked by a hand of a user, and when the electronic device is flipped over, display the second user interface in the area that is on the second display and that is not blocked by the hand of the user. Herein, for a method for determining, by the electronic device, the area that is on the second display and that is not blocked by the hand of the user, and a manner of displaying the second user interface in the area that is on the second display and that is not blocked by the hand of the user, refer to related descriptions in the embodiment in FIG. 12a and FIG. 12b.

In some embodiments, before the electronic device is flipped over, the first display faces the user, and the back of the second display faces the user. After the electronic device is flipped over, the second display faces the user, and the back of the first display faces the user.

Figure 19:
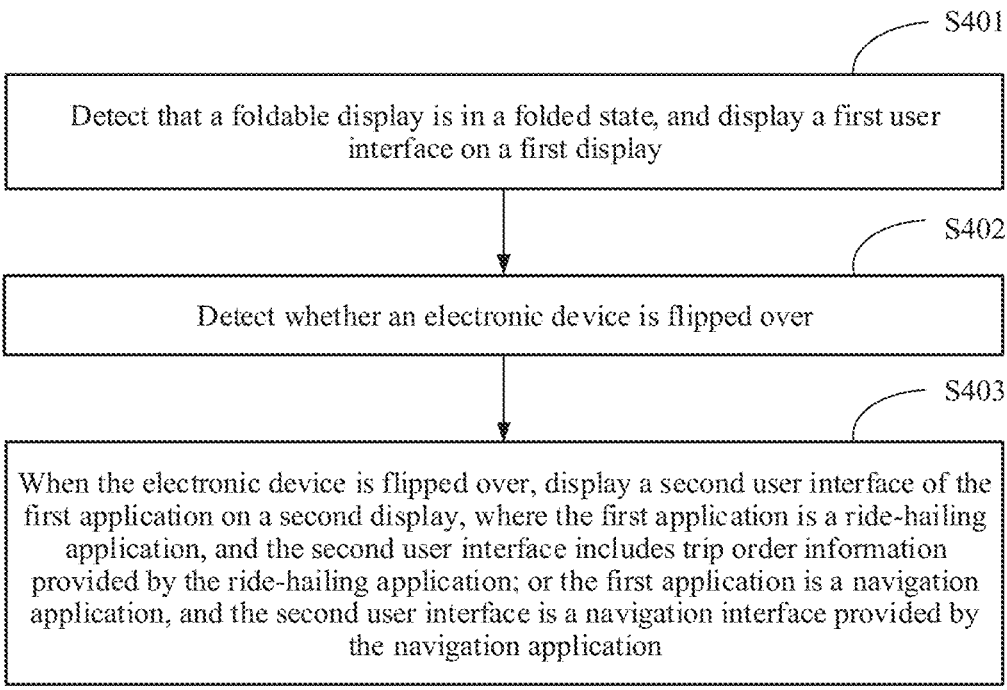

FIG. 19 is a schematic flowchart of a display method according to an embodiment of this application. The display method shown in FIG. 19 corresponds to the application scenario 4. The display method is applied to an electronic device provided with a foldable display, and the foldable display includes a first display and a second display. For definitions of the first display and the second display, refer to the foregoing related descriptions.

As shown in the figure, the display method may include the following steps.

Step S401: Detect that the foldable display is in a folded state, and display a first user interface on the first display.

Specifically, a method for detecting, by the electronic device, whether the foldable display is in the folded state or an unfolded state is the same as that in step S101 in FIG. 16. For details, refer to related descriptions.

For an example of the first user interface, refer to FIG. 7b.

In some embodiments, before detecting that the foldable display is in the folded state, the electronic device may detect that the foldable display is in the unfolded state, and display a third user interface, where the third user interface is displayed on both the first display and the second display, and content displayed in the third user interface includes content displayed in the first user interface. Further, in some embodiments, the electronic device may display the third user interface on the foldable display in full screen. Herein, for a definition of the third user interface, refer to related descriptions in the embodiment in FIG. 7a to FIG. 7c. In other words, the folded state of the foldable display may change from the unfolded state.

In some embodiments, the electronic device may stop power supply to the second display or may display content on the second display when displaying the first user interface on the first display. This is not limited herein.

Step S402: Detect whether the electronic device is flipped over.

Specifically, for a meaning of flipping over the electronic device, refer to related descriptions in the embodiment in FIG. 7a to FIG. 7c. For a method for detecting whether the electronic device is flipped over, refer to related descriptions in the embodiment in FIG. 7a to FIG. 7c.

Step S403: When the electronic device is flipped over, display a second user interface of the first application on the second display, where the first application is a ride-hailing application, and the second user interface includes trip order information provided by the ride-hailing application; or the first application is a navigation application, and the second user interface is a navigation interface provided by the navigation application.

Specifically, for an example of the second user interface, refer to FIG. 7c.

In some embodiments, when displaying the second user interface on the second display, the electronic device may stop power supply to the first display, or may display the original user interface on the first display, that is, display the first user interface.

In some embodiments, the electronic device may further determine an area that is on the second display and that is not blocked by a hand of a user, and when the electronic device is flipped over, display the second user interface in the area that is on the second display and that is not blocked by the hand of the user. Herein, for a method for determining, by the electronic device, the area that is on the second display and that is not blocked by the hand of the user, and a manner of displaying the second user interface in the area that is on the second display and that is not blocked by the hand of the user, refer to related descriptions in the embodiment in FIG. 12a and FIG. 12b.

In some embodiments, before the electronic device is flipped over, the first display faces the user, and the back of the second display faces the user. After the electronic device is flipped over, the second display faces the user, and the back of the first display faces the user.

Figure 20:
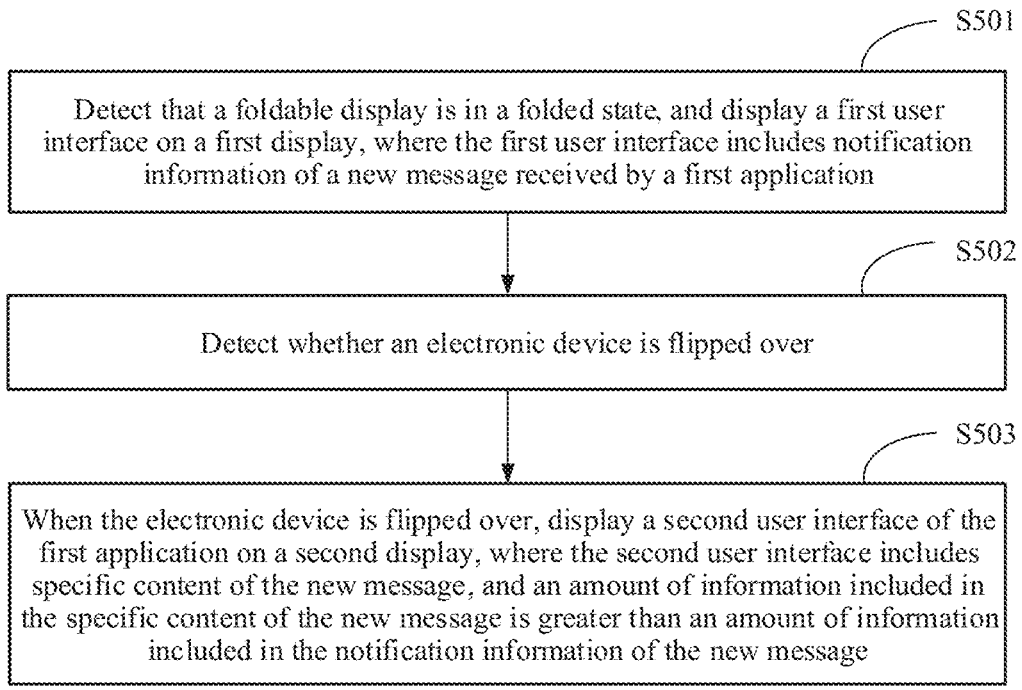

FIG. 20 is a schematic flowchart of a display method according to an embodiment of this application. The display method shown in FIG. 20 corresponds to the application scenario 5. The display method is applied to an electronic device provided with a foldable display, and the foldable display includes a first display and a second display. For definitions of the first display and the second display, refer to the foregoing related descriptions.

As shown in the figure, the display method may include the following steps.

Step S501: Detect that the foldable display is in a folded state, and display a first user interface on the first display, where the first user interface includes notification information of a new message received by a first application.

Specifically, a method for detecting, by the electronic device, whether the foldable display is in the folded state or an unfolded state is the same as that in step S101 in FIG. 16. For details, refer to related descriptions.

For an example of the first application, refer to related descriptions in the embodiment in FIG. 8a and FIG. 8b. For an example of the first user interface, refer to FIG. 8a.

In some embodiments, before detecting that the foldable display is in the folded state, the electronic device may detect that the foldable display is in the unfolded state, and display a third user interface, where the third user interface is displayed on both the first display and the second display, and content displayed in the third user interface includes content displayed in the first user interface. Further, in some embodiments, the electronic device may display the third user interface on the foldable display in full screen. Herein, for a definition of the third user interface, refer to related descriptions in the embodiment in FIG. 8a and FIG. 8b. In other words, the folded state of the foldable display may change from the unfolded state.

In some embodiments, the electronic device may stop power supply to the second display or may display content on the second display when displaying the first user interface on the first display. This is not limited herein.

Step S502: Detect whether the electronic device is flipped over.

Specifically, for a meaning of flipping over the electronic device, refer to related descriptions in the embodiment in FIG. 8a and FIG. 8b. For a method for detecting whether the electronic device is flipped over, refer to related descriptions in the embodiment in FIG. 8a and FIG. 8b.

Step S503: When the electronic device is flipped over, display a second user interface of the first application on the second display, where the second user interface includes specific content of the new message, and an amount of information included in the specific content of the new message is greater than an amount of information included in the notification information of the new message.

Specifically, for an example of the second user interface, refer to FIG. 8b.

In some embodiments, the electronic device may stop displaying the notification information of the new message on the first display when displaying the second user interface of the first application on the second display.

In some embodiments, when displaying the second user interface of the first application on the second display, the electronic device may stop power supply to the first display, or may display the original user interface on the first display, that is, display the first user interface.

In some embodiments, the electronic device may further determine an area that is on the second display and that is not blocked by a hand of a user, and when the electronic device is flipped over, display the second user interface in the area that is on the second display and that is not blocked by the hand of the user. Herein, for a method for determining, by the electronic device, the area that is on the second display and that is not blocked by the hand of the user, and a manner of displaying the second user interface in the area that is on the second display and that is not blocked by the hand of the user, refer to related descriptions in the embodiment in FIG. 12a and FIG. 12b.

In some embodiments, before the electronic device is flipped over, the first display faces the user, and the back of the second display faces the user. After the electronic device is flipped over, the second display faces the user, and the back of the first display faces the user.

Figure 21:
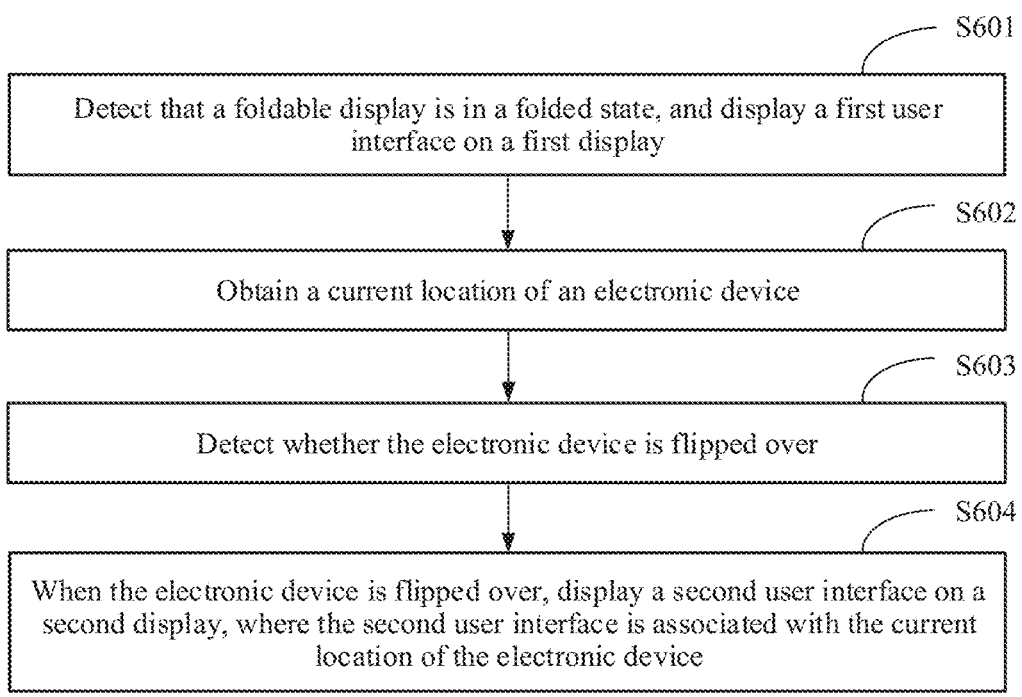

FIG. 21 is a schematic flowchart of a display method according to an embodiment of this application. The display method shown in FIG. 21 corresponds to the application scenarios 6 to 8. The display method is applied to an electronic device provided with a foldable display, and the foldable display includes a first display and a second display. For definitions of the first display and the second display, refer to the foregoing related descriptions.

As shown in the figure, the display method may include the following steps.

Step S601: Detect that the foldable display is in a folded state, and display a first user interface on the first display.

Specifically, a method for detecting, by the electronic device, whether the foldable display is in the folded state or an unfolded state is the same as that in step S101 in FIG. 16. For details, refer to related descriptions.

For examples of the first user interface, refer to FIG. 9a, FIG. 10a, and FIG. 11a.

In some embodiments, before detecting that the foldable display is in the folded state, the electronic device may detect that the foldable display is in the unfolded state, and display a third user interface, where the third user interface is displayed on both the first display and the second display, and content displayed in the third user interface includes content displayed in the first user interface. Further, in some embodiments, the electronic device may display the third user interface on the foldable display in full screen. Herein, for a definition of the third user interface, refer to related descriptions in the embodiments in FIG. 9a to FIG. 11b. In other words, the folded state of the foldable display may change from the unfolded state.

In some embodiments, the electronic device may stop power supply to the second display or may display content on the second display when displaying the first user interface on the first display. This is not limited herein.

Step S602: Obtain a current location of the electronic device.

Specifically, for a manner of obtaining the current location by the electronic device, refer to related descriptions in the embodiment in FIG. 9a and FIG. 9b.

Step S603: Detect whether the electronic device is flipped over.

Specifically, for a meaning of flipping over the electronic device, refer to related descriptions in the embodiments in FIG. 9a to FIG. 11b. For a method for detecting whether the electronic device is flipped over, refer to related descriptions in the embodiments in FIG. 9a to FIG. 11b.

Step S604: When the electronic device is flipped over, display a second user interface on the second display, where the second user interface is associated with the current location of the electronic device.

In some embodiments, when the electronic device is located in a subway station, the second user interface includes a subway ride code, or the second user interface is an NFC bus card swiping interface. For a manner of obtaining the subway ride code or the NFC bus card swiping interface, refer to related descriptions in the embodiment in FIG. 9a and FIG. 9b. Herein, for an example of the second user interface, refer to FIG. 9b.

In some embodiments, when the electronic device is located in a shopping mall, the second user interface includes a payment code, or the second user interface is an NFC bank card payment interface. For a manner of obtaining the payment code and the NFC bank card payment interface, refer to related descriptions in the embodiment in FIG. 10a and FIG. 10b. Herein, for an example of the second user interface, refer to FIG. 10b.

In some embodiments, when a distance between a location of the electronic device and a parcel locker is less than a preset value, the second user interface includes a parcel pickup code. For a manner of obtaining the parcel pickup code, refer to related descriptions in the embodiment in FIG. 11a and FIG. 11b. Herein, for an example of the second user interface, refer to FIG. 11b.

In some embodiments, the electronic device may stop displaying the notification information of the new message on the first display when displaying the second user interface on the second display.

In some embodiments, when displaying the second user interface on the second display, the electronic device may stop power supply to the first display, or may display the original user interface on the first display, that is, display the first user interface.

In some embodiments, the electronic device may further determine an area that is on the second display and that is not blocked by a hand of a user, and when the electronic device is flipped over, display the second user interface in the area that is on the second display and that is not blocked by the hand of the user. Herein, for a method for determining, by the electronic device, the area that is on the second display and that is not blocked by the hand of the user, and a manner of displaying the second user interface in the area that is on the second display and that is not blocked by the hand of the user, refer to related descriptions in the embodiment in FIG. 12a and FIG. 12b.

In some embodiments, before the electronic device is flipped over, the first display faces the user, and the back of the second display faces the user. After the electronic device is flipped over, the second display faces the user, and the back of the first display faces the user.

The implementations of this application may be randomly combined to achieve different technical effects.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

What is claimed is:

1. An electronic device, comprising one or more processors, a memory, a foldable display, a first camera, and a second camera, wherein the foldable display, when folded, comprises a first display and a second display, an aspect ratio of the second display is less than an aspect ratio of the first display, the first camera is disposed on a same side of the electronic device as the first display, and the second camera is disposed at on a same side of the electronic device as the second display; and wherein the memory and the foldable display are coupled to the one or more processors, the memory is configured to store computer program code, the computer program code comprises computer instructions, which when executed by the one or more processors, cause the electronic device to perform following operations:

detecting that the foldable display is in a folded state, and displaying a first user interface of a first application on the first display, wherein the first application is a video call application, the first user interface comprises an image of a first user captured by the first camera and an image of a second user, the first user and the second user being in a video call, and the image of the first user captured by the first camera overlaps the image of the second user;

detecting whether the electronic device in the folded state is flipped over; and when the electronic device in the folded state is flipped over, displaying a second user interface of the first application on the second display, wherein the second user interface comprises an image of the first user captured by the second camera and the image of the second user, and the image of the first user captured by the second camera does not overlap the image of the second user.

2. The electronic device according to claim 1, wherein the computer instructions, when executed by the one or more processors, cause the electronic device further to perform following operations:

before detecting that the foldable display is in the folded state, detecting that the foldable display is in an unfolded state, and displaying a third user interface of the first application, wherein the third user interface is displayed on both the first display and the second display, and the third user interface is an enlarged first user interface.

3. The electronic device according to claim 2, wherein displaying the third user interface of the first application comprises: displaying the third user interface of the first application on the foldable display in full screen.

4. The electronic device according to claim 1, wherein the computer instructions, when executed by the one or more processors, cause the electronic device further to stop power supply to the second display when displaying the first user interface of the first application on the first display.

5. The electronic device according to claim 1, wherein the computer instructions, when executed by the one or more processors, cause the electronic device further to stop power supply to the first display when displaying the second user interface of the first application on the second display.

6. A method, comprising:
- detecting, by an electronic device, that a foldable display of the electronic device is in a folded state, wherein the electronic device comprises a first camera and a second camera, wherein the foldable display, when folded, comprises a first display and a second display, an aspect ratio of the second display is less than an aspect ratio of the first display, the first camera is disposed on a same side of the electronic device as the first display, and the second camera is disposed on a same side of the electronic device as the second display;
- displaying, by the electronic device, a first user interface of a first application on the first display, wherein the first application is a video call application, the first user interface comprises an image of a first user captured by the first camera and an image of a second user, the first user and the second user are in a video call when the first user interface is displayed, and the image of the first user captured by the first camera overlaps the image of the second user;
- detecting, by the electronic device, whether the electronic device in the folded state is flipped over; and
- when it is detected that the electronic device in the folded state is flipped over, displaying, by the electronic device, a second user interface of the first application on the second display, wherein the second user interface comprises an image of the first user captured by the second camera and the image of the second user, and the image of the first user captured by the second camera does not overlap the image of the second user.

7. The method according to claim 6, further comprising:
- before detecting that the foldable display is in the folded state, detecting that the foldable display is in an unfolded state, and displaying a third user interface of the first application, wherein the third user interface is displayed on both the first display and the second display, and the third user interface is an enlarged first user interface.

8. The method according to claim 7, wherein displaying the third user interface of the first application comprises:
- displaying the third user interface of the first application on the foldable display in full screen.

9. The method according to claim 6, further comprising:
- stopping power supply to the second display when displaying the first user interface of the first application on the first display.

10. The method according to claim 6, further comprising:
- stopping power supply to the first display when displaying the second user interface of the first application on the second display.

11. A non-transitory computer readable storage medium storing a program that is executable by at least one processor, the program including instructions for:
- detecting that a foldable display of an electronic device is in a folded state, wherein the electronic device comprises a first camera and a second camera, wherein the foldable display, when folded, comprises a first display and a second display, an aspect ratio of the second display is less than an aspect ratio of the first display, the first camera is disposed on a same side of the electronic device as the first display, and the second camera is disposed on a same side of the electronic device as the second display;
- displaying a first user interface of a first application on the first display, wherein the first application is a video call application, the first user interface comprises an image of a first user captured by the first camera and an image of a second user, the first user and the second user are in a video call when the first user interface is displayed, and the image of the first user captured by the first camera overlaps the image of the second user;
- detecting whether the electronic device in the folded state is flipped over; and
- when it is detected that the electronic device in the folded state is flipped over, displaying a second user interface of the first application on the second display, wherein the second user interface comprises an image of the first user captured by the second camera and the image of the second user, and the image of the first user captured by the second camera does not overlap the image of the second user.

12. The non-transitory computer readable storage medium according to claim 11, the program further including instructions for:
- before detecting that the foldable display is in the folded state, detecting that the foldable display is in an unfolded state, and displaying a third user interface of the first application, wherein the third user interface is displayed on both the first display and the second display, and the third user interface is an enlarged first user interface.

13. The non-transitory computer readable storage medium according to claim 12, wherein displaying the third user interface of the first application comprises:
- displaying the third user interface of the first application on the foldable display in full screen.

14. The non-transitory computer readable storage medium according to claim 11, the program further including instructions for:
- stopping power supply to the second display when displaying the first user interface of the first application on the first display.

15. The non-transitory computer readable storage medium according to claim 11, the program further including instructions for:
- stopping power supply to the first display when displaying the second user interface of the first application on the second display.

* * * * *